(12) United States Patent
Keller et al.

(10) Patent No.: US 11,155,243 B2
(45) Date of Patent: Oct. 26, 2021

(54) OPTICAL SYSTEM TO FACILITATE VEHICLE OPERATION, CLEANING SYSTEM TO CLEAN AN OPTICAL ELEMENT OF THE OPTICAL SYSTEM AND HOLLOW PROTECTIVE PLASTIC ENCLOSURE FOR USE THEREIN

(71) Applicant: Global IP Holdings, LLC, Sterling Heights, MI (US)

(72) Inventors: Michael John Keller, White Lake, MI (US); Darius John Preisler, Macomb, MI (US)

(73) Assignee: GLOBAL IP HOLDINGS, LLC, Sterling Heights, MI (US)

( * ) Notice: Subject to any disclaimer, the term of this patent is extended or adjusted under 35 U.S.C. 154(b) by 120 days.

(21) Appl. No.: 16/276,782

(22) Filed: Feb. 15, 2019

(65) Prior Publication Data

US 2020/0262396 A1 Aug. 20, 2020

(51) Int. Cl.
*B60S 1/52* (2006.01)
*B60S 1/48* (2006.01)
*B60S 1/60* (2006.01)

(52) U.S. Cl.
CPC ............... *B60S 1/52* (2013.01); *B60S 1/481* (2013.01); *B60S 1/60* (2013.01)

(58) Field of Classification Search
CPC .............. B60S 1/46–523; B60S 1/56–566
See application file for complete search history.

(56) References Cited

U.S. PATENT DOCUMENTS

| | | | |
|---|---|---|---|
| 3,469,088 A | 9/1969 | Coleman et al. | |
| 4,026,468 A | 5/1977 | Tinder et al. | |
| 5,083,339 A | 1/1992 | Bristow | |
| 5,512,969 A * | 4/1996 | Harris | G03B 17/08 396/25 |
| 5,966,176 A * | 10/1999 | Chow | G08B 13/19632 348/143 |

(Continued)

FOREIGN PATENT DOCUMENTS

CN 106347316 A * 1/2017 ............... B60R 1/00

OTHER PUBLICATIONS

SpecialChem, Comprehensive List of Transparent Polymers, Oct. 25, 2017, Omnexus, (Year: 2017).*

*Primary Examiner* — Spencer E. Bell
*Assistant Examiner* — Omair Chaudhri
(74) *Attorney, Agent, or Firm* — Brooks Kushman P.C.

(57) ABSTRACT

An optical system to facilitate vehicle operation, a cleaning system to clean an optical element of the optical system and a hollow, protective plastic enclosure for use therein are provided. The cleaning system includes a flexible house having first and second ends, a nozzle fluidly coupled to the hose at the first end of the hose and a hollow protective plastic enclosure having a passageway extending through the enclosure and housing a portion of the hose within the passageway. The enclosure is configured to receive a camera assembly within an interior of the enclosure. The nozzle is configured and positioned at the first end of the hose to direct the flow of a cleaning fluid therethrough to an exterior surface of a transparent optical element to clean the exterior surface to allow the camera assembly to have an unobstructed view of an environment outside the vehicle.

8 Claims, 14 Drawing Sheets

(56) References Cited

U.S. PATENT DOCUMENTS

| | | | |
|---|---|---|---|
| 9,180,840 B2 | 11/2015 | Tanaka et al. | |
| 9,278,670 B2 | 3/2016 | Hattori et al. | |
| 9,296,339 B2 * | 3/2016 | Bingle | H04N 5/374 |
| 2002/0005440 A1 | 1/2002 | Holt et al. | |
| 2006/0171704 A1 * | 8/2006 | Bingle | H04N 5/2254 |
| | | | 396/419 |
| 2007/0296853 A1 * | 12/2007 | Ho | G03B 17/08 |
| | | | 348/373 |
| 2009/0250533 A1 | 10/2009 | Akiyama et al. | |
| 2009/0277454 A1 * | 11/2009 | Davis | B65H 75/48 |
| | | | 128/207.18 |
| 2011/0073142 A1 * | 3/2011 | Hattori | B60S 1/56 |
| | | | 134/56 R |
| 2011/0292212 A1 | 12/2011 | Tanabe et al. | |
| 2014/0270379 A1 | 9/2014 | Snider | |
| 2017/0172397 A1 * | 6/2017 | Zardini | A61B 1/00048 |
| 2018/0312141 A1 * | 11/2018 | Ghannam | B60S 1/56 |
| 2018/0334140 A1 | 11/2018 | Ghannam et al. | |
| 2018/0345917 A1 * | 12/2018 | Yamamoto | G02B 27/0006 |
| 2019/0039531 A1 * | 2/2019 | Wilson | B60S 1/528 |
| 2019/0314865 A1 * | 10/2019 | Sevak | B08B 5/02 |
| 2020/0139060 A1 * | 5/2020 | Turner | A61L 2/10 |

\* cited by examiner

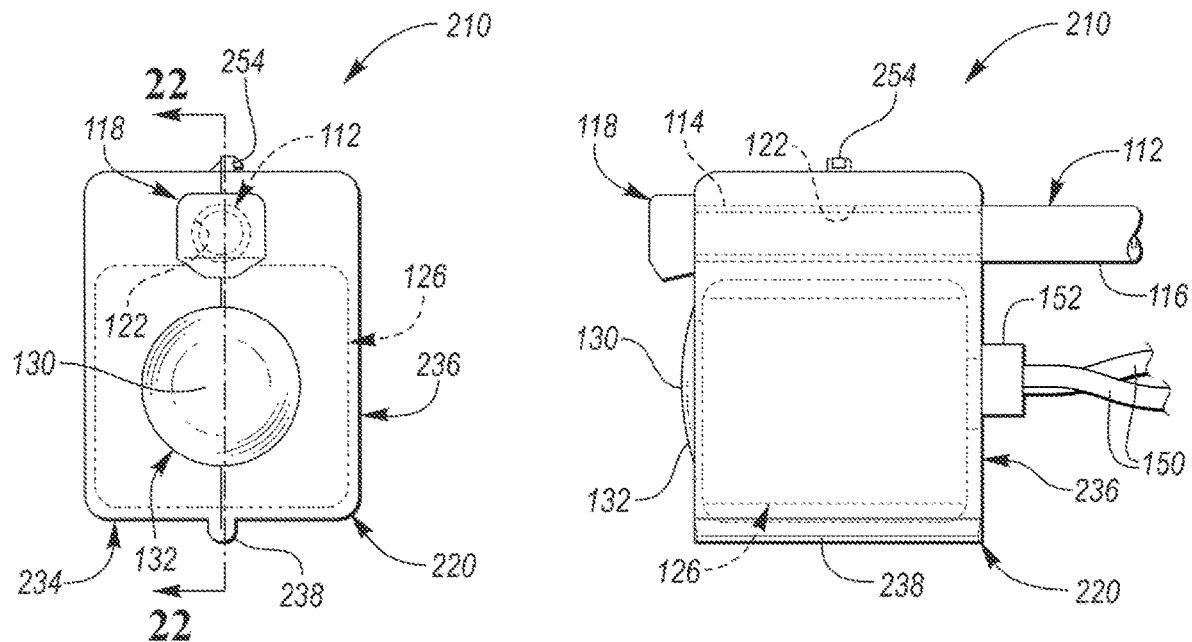
FIG. 20
FIG. 21
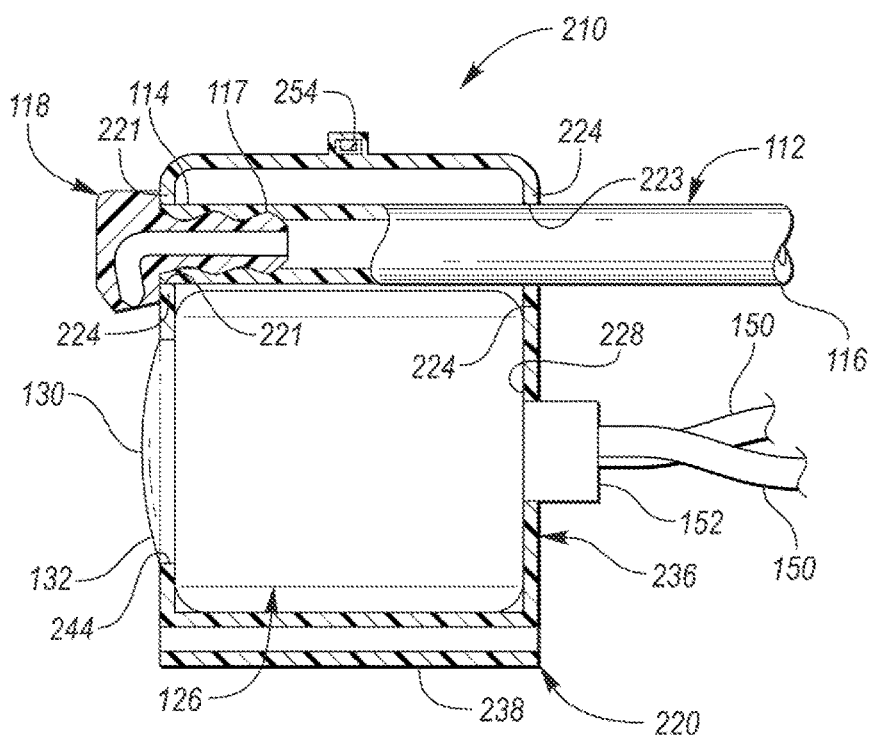
FIG. 22

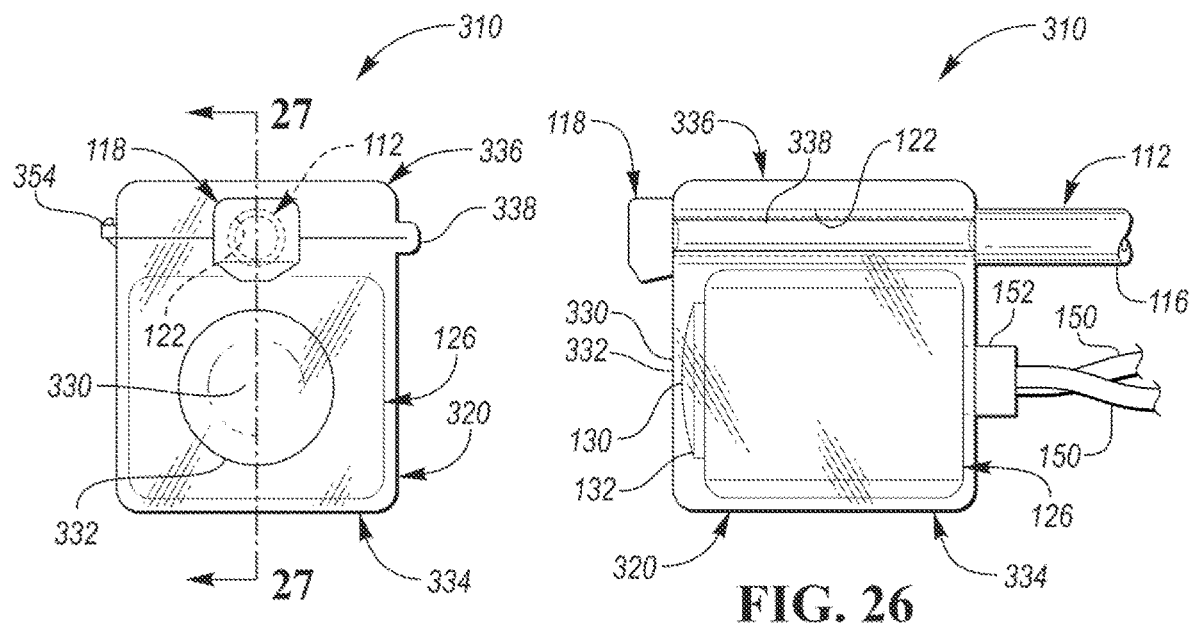
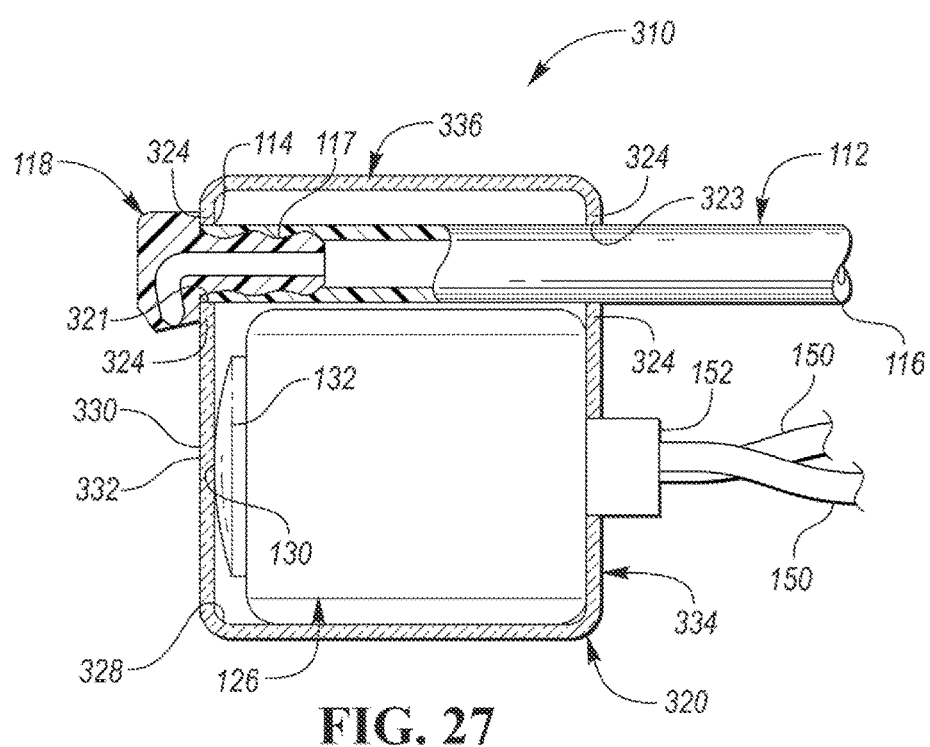

OPTICAL SYSTEM TO FACILITATE VEHICLE OPERATION, CLEANING SYSTEM TO CLEAN AN OPTICAL ELEMENT OF THE OPTICAL SYSTEM AND HOLLOW PROTECTIVE PLASTIC ENCLOSURE FOR USE THEREIN

TECHNICAL FIELD

Embodiments of the present invention generally relate to optical systems to facilitate vehicle operation, cleaning systems to clean optical elements of the optical systems and hollow protective plastic enclosures for use therein.

OVERVIEW

A parking aid for motor vehicles is known to include a detector that can be mounted on the motor vehicle and an information provider in or on a driver's cab. The detector, which can be a radar, imaging or other electromagnetic, electro-optic or sonic device, includes a sensor and a control apparatus. Signals from the detector which advise of a situation in the blind spot of the motor vehicle can be transmitted to the information provider to inform the driver about a situation in the blind spot. If the detector is an image sensor, the information is available to the driver by a screen display or similar device.

In the above-noted system, the driver may be assisted during a backing up operation, for example, when parking in a manner to avoid running into an obstruction such as a parked motor vehicle or the like. The connection between the information provider and the detection equipment in such parking aids may be implemented wirelessly or by electrical wiring.

Such a system and unit have a large potential to prevent accidents which happen during vehicle backup, thereby enhancing the safety of the vehicle, objects and pedestrians who are often distracted and unaware of potentially dangerous back up situations, as well as other vehicle operations.

As described in published U.S. patent application 2018/0334140, typically passenger vehicles include windshields, such as a front windshield and a rear windshield, through which a driver and/or other occupant(s) view a surrounding area. Some vehicles also include cameras that capture image(s) and/or video of the surrounding area. For example, the image(s) and/or video captured by camera(s) may be presented to the driver to facilitate the driver in operating the vehicle and/or analyzed to facilitate autonomous or semi-autonomous operation of the vehicle. Some vehicle cameras are located within a cabin of the vehicle and are directed toward a windshield and/or window through which image(s) and/or video of the surrounding area of the vehicle are captured. Other vehicle cameras are located along an external surface of the vehicle to enable the camera to capture image(s) and/or video of the surrounding area of the vehicle. Oftentimes, washer fluid is applied to the windshield(s) and/or external camera(s) of the vehicle when debris and/or other material (e.g., rain, ice, snow) is located on those surfaces. In some instances, the washer fluid is unable to be applied and/or is able to be only partially applied. For example, the washer fluid may incompletely applied due to the washer fluid being frozen, a washer fluid nozzle being clogged, a washer fluid reservoir being empty or damaged, a washer fluid line being severed and/or otherwise damaged, etc.

A washer fluid controller may diagnose whether washer fluid nozzle(s) of a vehicle are clogged and/or whether delivery of washer fluid is being impeded to the washer fluid nozzle(s). The washer fluid controller determines whether the washer fluid nozzle is impeded based upon image(s) and/or video of windshield(s) and/or camera len(s) to which the washer fluid is to be applied via the washer fluid nozzles. Upon detecting that one or more of the washer fluid nozzles is clogged, the washer fluid controller causes an electronic pump to pump pressurized air (e.g. head pressurized air) through the washer fluid nozzles to unclog the washer fluid nozzles. In some examples, the electronic pump is an e-Turbo pump that pumps pressurized air to an engine of the vehicle when the engine is on to improve the performance of the vehicle and pumps the pressurized air through the washer fluid nozzles when the engine is off to unclog the washer fluid nozzles.

As described in published U.S. patent application 2002/0005440, the headlight, taillight and other lens surfaces of transport vehicles frequently become dirty or laden with snow and ice. Devices have been employed that clean headlights and it is known to direct pressurized air and fluid against headlights for this purpose as is shown in U.S. Pat. No. 3,469,088. U.S. Pat. No. 4,026,468 relates to a headlight cleaning assembly that cleans vehicle headlights by using first and second nozzles for jetting an air/fluid mixture against the headlight surface. U.S. Pat. No. 5,083,339 shows a lens cleaning apparatus employing a nozzle which cleans the lens in reciprocating movements of an arm.

A problem arises with vehicles employing detectors such as video camera, to assist in the driver being able to see blind spots behind the vehicle and other spots in front of the vehicle. Such applications are especially common in vehicles such as refuse haulers, buses and large recreational vehicles, for example. If the camera lens becomes dirty from road spray or dust, or the like, the driver's view may be compromised.

As described in published U.S. patent application 2014/0270379, FIG. 1 shows a vehicle 10 with a camera 12 located on a grill 14 of the vehicle 10. In this example, the camera 12 points forward and is capable of capturing an image 18 of an environment in front of the vehicle 10. The image 18 may be displayed on a display or video screen 20 within a vehicle cabin and aid a driver in seeing objects located in the path of the vehicle. The image 18 generated by the camera 12 may a real-time image or a still image.

A forward-view image displayed within the vehicle cabin may be advantageous for vehicles with a high hood-line or other geometry that may block the driver's view of the environment directly in front of the vehicle. Such a forward-view may be particularly advantageous for vehicles that are used for recreational off-roading. Having a displayed image of the environment immediately in front of the vehicle that would otherwise be blocked from the driver's view could aid in choosing the most advantageous wheel path when traversing undulating terrain. Forward-view cameras may also be used for obstacle detection and lane detections systems. As well, cameras may be deployed around the exterior of a vehicle and used in conjunction with vision systems for autonomous vehicles.

FIG. 2 shows the camera 12 mounted to the grill 14 of vehicle 10. The camera may be mounted to any other appropriate structure of the vehicle, such as a front fascia, bumper, hood or roof. The camera 12 has a field of vision 22 bounded by a camera view angle upper limit 24 and a camera view angle lower limit 26. The camera 12 is capable of capturing an image 18 within the camera field of vision 22. In the depicted embodiment, the camera 12 is oriented such that an exterior vehicle component 30 is captured in the field of vision 22. The exterior vehicle component 30 leading edge 32 establishes a ground view proximal limit 34 that ends at a proximal point 36. If the camera is orientated such that an exterior vehicle component 30 is not captured in the field of vision 22, then the camera view angle lower limit 26 will coincide with the ground view proximal limit 34 and end at the proximal point 36. The camera 12 may also be orientated and focused such that a camera view angle center line 38 is directed to a distal point 40 a fixed horizontal distance 42 from the proximal point 36.

The exterior vehicle component 30 is shown as a front fascia component 46 adjacent to and/or covering a portion of a front bumper 48. The camera 12 may also be placed on the vehicle 10 in varying orientations and directions in which the ground view proximal limit 34 may be provided by other exterior vehicle components 30, or portions of exterior vehicle components, such as bumpers, spoilers, fenders, doors, hoods, trunks, hatches or tailgates. Multiple exterior vehicle components 30 may be captured in the field of vision 22 and provide a varying ground view proximal limit 34 across the field of vision 22. The ground view proximal limit 34 may also be provided by a combination of the camera view angle lower limit 26 and ground view proximal limit 34 across the field of vision 22.

FIG. 3 shows a camera 12 having a camera lens 52 disposed proximate an outlet 54 of a spray nozzle 56. The spray nozzle 56 is fluidly connected to a pump 58 via a first fluid delivery tube 60. The pump 58 is, in turn, in fluid communication with a windshield washer system 62 via a second fluid delivery tube 64. The pump 58 may be connected directly to the spray nozzle 56 eliminating the need for the first fluid delivery tube 60. The pump 58 may also be the same pump as used in the windshield washer system 62, or disposed inside of a reservoir in the windshield washer system 62, eliminating the need for the second fluid delivery tube 64. Alternatively, the pump 58 may be connected to a separate and exclusive fluid reservoir (not shown) instead of being incorporated into the vehicle's windshield washer system 62.

The windshield washer system 62 holds washer fluid 66 and the pump 58 is actuated to draw the fluid 66 from the windshield washer system 62 and deliver it to the spray nozzle 56. The spray nozzle 56, in turn, is configured to direct the fluid 66 onto the camera lens 52 of the camera 12. The pump 58 and spray nozzle 56 may be configured in combination to deliver a spray of suitable force and coverage to clean the camera lens 52.

The pump 58 may be activated by a driver using a camera wash button, switch, or similar control (not shown) located in the vehicle cabin. The pump 58 may also be activated by a controller 68, or processing unit, operatively associated with the camera 12 and the pump 58. The controller may send an image request signal 72 to the camera 12 and receive an image signal 74a back from the camera 12. The system may also be configured for the camera 12 to transmit a constant image signal 74a feed to the controller 68 without need of the image request signal 72. The controller 68 performs a digital analysis on the camera image to determine if the image is obstructed. If the image is determined to be obstructed, the controller 68 sends a pump activation signal 76 to activate the pump and spray the camera lens 52.

To prevent the system from draining a washer fluid supply unnecessarily if an obstruction on the lens cannot be cleared by the spray system, the controller 68 may be configured to deliver a limited/maximum number, n, of sprays in a single activation sequence then cease spraying. This may be achieved, for example, by configuring the controller 68 to increment a spray count by a count of one when sending the pump activation signal 76. The controller them may accrue the spray counts and only send a pump activation signal 76 if the spray count is less than N+1. If n is set as 2, for example, the automatic spraying system will spray the camera lens 52 only two times during a sequence then stop to avoid wasting more fluid.

FIG. 4 shows the spray nozzle 56 disposed on the grill 14 below the camera 12. The outlet 54 of the spray nozzle 56 is directed upwards to spray the camera lens 52. In a forward-view image embodiment of a vehicle with a partially blocking hood-line, the area of the environment most useful to the driver is provided by the camera between the ground view proximal limit 34 and the camera view angle center line 38 (see FIG. 2). The spray nozzle outlet 54 may be pointed at this lower area of the camera lens 52 to focus the spray more in this area and provide a more efficient system. Alternatively, the spray nozzle 56 may be located above and/or to the side of the camera lens 52 from the top or sides, the location chosen to provide better cleaning efficiency for its intended application.

The camera 12 may simultaneously send an image signal 74b to the video screen display 20 located in the vehicle or the controller 68 may send an image signal 74c to the video screen display 20. The image request signal 72 and image signals 74a, 74b, 74c may be sent and received wirelessly using a transceiver, or sent and received through a hard wire connection between the components. The camera 12 may also be designed to broadcast an image signal 74 that may be received by any device tuned into the broadcast signal.

The automatic spraying system may use fluid 66 from the windshield washer system 62 thus taking away fluid 66 from being used to wash the windshield or other intended purpose. To minimize this concern, the controller may be in communication with the windshield washer system 62 and receive a fluid level signal 78. The controller 68 may be programmed to send a pump activation signal 76 only when the remaining quantity of fluid 66 is above a set level within the windshield washer system 62. As well, the controller 68 and/or pump 58 may be configured to provide an activation of the spray nozzle 56 that is of a controlled duration, such as one second.

As described in published U.S. patent application 2018/0345917, FIG. 5 is a diagram illustrating a vehicle C that is mounted with the camera unit 1. As illustrated in FIG. 5, the camera unit 1 is placed at, for example, a position that is above a license plate 93 on a rear part of the vehicle C and substantially a center of the vehicle C in a vehicle width direction. The camera unit 1 at such a position captures, for example, an image for a back view behind the vehicle C.

FIG. 6 is a schematic cross-sectional view along line A-A as illustrated in FIG. 5. Additionally, FIG. 6 illustrates the camera unit 1 in a case where a nozzle that sprays a fluid is not possessed thereby, for convenience of a description(s) thereof.

As illustrated in FIG. 6, the license plate 93 is attached to a vehicle body panel 91 that is made of a metal on a rear part of the vehicle C. Furthermore, a garnish 92 that is formed of, for example, a resin or the like is attached the vehicle body panel 91 above the license plate 93.

A space 94 capable of arranging a component or the like is formed between the vehicle body panel 91 and the garnish 92. A bottom surface 92a of the garnish 92 is provided in such a manner that its planner direction is substantially parallel to, for example, a horizontal direction. Additionally, a garnish hole 92b is opened in the bottom surface 92a.

The camera unit 1 is supported by the vehicle body panel 91 via a bracket 2 (an example of a supporting part). The bracket 2 is fixed so as to cover a body hole 91a that is opened in the vehicle body panel 91. The camera unit 1 is attached to such a bracket 2 and is supported by the bracket 2 in a state where an image-capturing direction is inclined with respect to a vertical direction so as to be capable of capturing an image behind the vehicle C.

A proximal end side of the camera unit 1 is arranged on an in-vehicle side and connected to a wiring. Its distal end side is arranged on a space 94 side and a lens 4a is exposed through the garnish hole 92b. Additionally, a gap between the camera unit 1 and the garnish 92 may be of approximately several millimeters depending on a kind of the vehicle C and the space 94 is a narrow space.

As illustrated in FIG. 7, the camera unit 1 includes the bracket 2, packing 3, the camera 4, a nozzle 5, a holder 6, a cushion 7, and a hose 10.

The bracket 2 is formed of, for example, a resin or the like, supports the camera 4 on its front surface side that is an X-axis positive direction side and its back surface side is fixed on a surface for placement thereof. A surface for placement thereof is, for example, a surface of the vehicle body panel 91 on a garnish 92 side (see FIG. 6). The aforementioned body hole 91a is opened in a surface for placement thereof and the bracket 2 is attached to cover such a body hole 91a. The bracket 2 is a member that positions the camera unit 1.

Additionally, the bracket 2 is communicated with the body hole 91a and has through-holes 2a, 2b for passing wiring to the camera 4 and a proximal end part 5c of the nozzle 5 therethrough.

The packing 3 is formed of, for example, a rubber or the like, and provided while being interposed between the bracket 2 and a set of the camera 4 and the nozzle 5 that are integrated as described later. The packing 3 is, for example, a seal member.

The camera 4 includes the lens 4a and its body part is formed of a resin or the like. The nozzle 5 is provided with a contact part 5b that contacts the packing 3 and is formed, for example, of a resin or the like and into a shape capable of being in close contact with an outline of the camera 4. For example, in the present embodiment, the nozzle 5 is formed so as to be capable of being in contact with an outline of a top part of the camera 4 that is provided on a Z-axis positive direction side and be of a low shape, as illustrated in FIG. 7.

Thereby, it is possible to attain space saving for a space that is needed to arrange the camera 4 and the nozzle 5. That is, the camera unit 1 is downsized so that it is possible to facilitate its attachment in the space 94.

Furthermore, the nozzle 5 is provided with a distal end part that is arranged so as to be capable of discharging a fluid toward the lens 4a of the camera 4. Specifically, in a case where the nozzle 5 is mounted on a top part of the camera 4, a discharge port 5a that is a distal end part is formed into a shape that droops down toward the lens 4a. Thereby it is possible to spray a fluid toward the lens 4a reliably.

The holder 6 is a member that integrally fixes the camera 4 and the nozzle 5. The holder 6 is formed of, for example, a resin of the like and has a first fitting part 6a and a second fitting part 6b.

The first fitting part 6a has a protrusion that corresponds to a non-illustrated recess of the nozzle 5 and the second fitting part 6b has a protrusion that corresponds to a non-illustrated recess of the camera 4.

Then, the holder 6 is attached so as to cover the camera 4 and the nozzle 5 that are in contact with one another and each of the aforementioned protrusions is fitted into a corresponding recess so that the camera 4 and the nozzle 5 are fixed integrally. Thereby, it is possible to readily prevent the nozzle 5 from causing its backlash with respect to the camera 4. Furthermore, it is possible to readily integrate the camera 4 and the nozzle 5 to attain downsizing thereof.

The cushion 7 is formed of, for example, a soft material such as a sponge. The cushion 7 buffers, for example, in a such a manner that vibration or the like of the vehicle C at a time of running thereof is not transmitted to the camera unit 1. Thereby, it is possible to prevent positional misalignment or dropping of the camera unit 1.

The hose 10 is a cylindrical member that is formed of, for example, a material that has flexibility such as a rubber. The hole 10 is connected to the proximal end part 5c of the nozzle 5 and supplies a fluid to the nozzle 5.

In a case where a hose is connected to a proximal and part of a nozzle in a conventional camera unit, the hose is prevented from being detached from the proximal end part of the nozzle by using, for example, another member such as a fastening member.

However, if another member is used, the number of components in a product of a camera unit increases and manufacturing man-hours for execution of a fastening process with a fastening member, so that cost may increase.

Hence, in the camera unit 1 according to an embodiment, a detachment prevention function is added to the bracket 2, so that the hose 10 is not readily detached therefrom without providing another member thereon.

As illustrated in FIG. 8, the bracket 2 in the camera unit 1 is first attached to the vehicle body panel 91 that is a surface for placement thereof. Furthermore, the bracket 2 supports the camera 4 and the nozzle 5 that are in close contact with one another on a surface for placement of the bracket 2 at a position of attachment thereof. Therefore, it is possible for the bracket 2 to position the camera 4 and the nozzle 5 on a surface for placement thereof at a suitable position.

The packing 3 is attached to the bracket 2. The packing 3 has through-holes 3a, 3b and the through-hole 3a and the through-hole 3b are communicated with the through-hole 2a and the through-hole 2b, respectively.

The camera 4 is attached to the packing 3. Additionally, the camera 4 is fastened with a fastening tool on a back side of the bracket 2. A wiring for the camera 4 is caused to pass through the body hole 91a via the through-holes 3b, 2b.

For the camera 4, the nozzle 5 is mounted on a top part of the camera 4. Herein, the proximal end part 5c of the nozzle 5 and the hose 10 are caused to pass through the body hole 91a via the through-holes 3a, 2a. Furthermore, as illustrated in FIG. 8, the nozzle 5 is fastened with a fastening tool SW2 such as a screw screwed on a front side of the camera 4.

Then, the holder 6 is attached so as to cover the camera 4 and the nozzle 5. Herein, as illustrated in FIG. 8, a protrusion 6aa that is possessed by the first fitting part 6a is fitted into a recess 5ba that is possessed by a contact part 5b of the nozzle 5. Furthermore, a protrusion 6ba (illustration omitted) that is possessed by the second fitting part 6b is fitted into a non-illustrated recess that is possessed by a proximal end side of the camera 4. Thereby, the holder 6 integrally fixes the camera 4 and nozzle 5.

As described in U.S. Pat. No. 9,180,840, FIG. 9 shows an injection nozzle 13 equipped with a rear camera 14. The rear camera 14 is built in the injection nozzle 13. The injection nozzle 13 has an inlet part 13a and an injection part 13b. Through the inlet part 13a, water particles are introduced in the injection nozzle 13. The injection part 13b injects the water particles onto the lens 14a of the rear camera 14.

As described in published U.S. patent application 2009/0250533, FIG. 10 illustrates a cross-sectional view of the washer nozzle-equipped camera apparatus 1. The washer nozzle-equipped camera apparatus 1 includes a camera 10 and a washer nozzle 20. The camera 10 has a lens 10a. The washer nozzle 20 is made of resin. The camera 10 and the washer nozzle 20 are integrated together to form the washer nozzle-equipped camera apparatus 1. Thus, the washer nozzle-equipped camera apparatus 1 is provided as a single unit.

For example, the camera 10 shoots an image of the area around a vehicle and projects the image onto a display monitor mounted on the vehicle.

The washer nozzle 20 has a washer fluid inlet 21a for receiving the washer fluid supplied from a pump and an air inlet 23a for taking in air.

The washer nozzle 20 further has a window duct 21, a camera duct 22, an air duct 23, and mounting hole 25. The window duct 21 allows the washer fluid received by the washer fluid inlet 21a to be sprayed on the rear window of the vehicle. The camera duct 22 allows the washer fluid received by the washer fluid inlet 21a to be sprayed on the lens 10a of the camera 10. The air duct 23 allows the air taken in through the air inlet 23a to be sprayed on the lens 10a of the camera 10. The mounting hole 25 allows the camera 10 to be mounted to the washer nozzle 20. Specifically, the camera 10 is inserted in the mounting hole 25 so that the camera 10 and the washer nozzle 20 can be integrated together to form the washer nozzle-equipped camera apparatus 1 as a single unit.

The window duct 21 extends from the washer fluid inlet 21a to a window spray outlet 21b for spraying the washer fluid on the rear window so as to carry the washer fluid from the washer fluid 21a to the window spray outlet 21b. The washer fluid flows through the window duct 21 in a direction indicated by an arrow W in FIG. 10. The window duct 21 branches at a branch portion B located on the way from the washer fluid inlet 21a to the window spray outlet 21b.

The camera duct 22 extends from the branch portion B of the window duct 21 to a camera spray outlet 22b for spraying the washer fluid on the lens 10a of the camera 10 so as to carry the washer fluid from the branch portion B to the camera spray outlet 22b. Thus, the window duct 21 and the camera duct 22 merge and communicate with each other.

The camera spray outlet 22b is positioned in a direction substantially parallel to an outer surface of the lens 10a of the camera 10 in such a manner that the camera spray outlet 22b can be located outside the viewing area of the camera 10. The washer fluid flowing through the camera duct 22 is sprayed from the camera spray outlet 22b on the lens 10a.

The camera duct 22 is smaller in cross section than the window duct 21.

A switcher 24 is located at the branch portion B of the window duct 21. The switcher 24 allows and prevents a flow of the washer fluid from the window duct 21 to the camera duct 22.

The switcher 24 includes a spring 24a and a valve 24b coupled to the spring 24a. The valve 24b works against a biasing force of the spring 24a by receiving pressure from the washer fluid flowing through the window duct 21.

The air duct 23 extends from the air inlet 23a to the camera duct 22. Thus, the air duct 23 and the camera duct 22 merge and communicate with each other.

Although not shown in the drawings, the air inlet 23a is coupled to an air intake port facing the front of the vehicle so that air taken in through the air intake during movement of the vehicle can enter the air duct 23 via the air inlet 23a.

When the vehicle starts moving, the air entering the air duct 23 is blown out from the camera spray outlet 22b by way of a portion of the camera duct 22. In this way, moisture such as rainwater and washer fluid adhering to the lens 10a of the camera 10 is removed by the air blown out from the camera spray outlet 22b so that lens 10a can be dried.

As described in published U.S. patent application 2011/0292212, as shown in FIGS. 11 AND 12, a camera C is a vehicle mounted camera and has a camera body 10 and camera washer nozzle (camera nozzle) 11 integrally attached to the camera body 10. The camera nozzle 11 discharges washer fluid W to remove foreign matter such as rain drops and mud on an image capturing surface 10a of the camera body 10.

Specifically, the camera body 10 includes a substantially cubic housing H, an image sensor 10c located in the housing H, and a lens 10d. One side of the housing H forms the image capturing surface 10a, which has a circular image capturing window 10b. The image sensor 10c faces the image capturing window 10b via the lens 10d. The camera nozzle 11 has a holder 12 that detachably holds the camera body 10. The holder 22 substantially encompasses the camera body 10, while exposing the image capturing surface 10a.

A nozzle body 13 is located above the camera body 10. A substantially cylindrically cylinder connector 14 projects from the back side of the nozzle body 13 (a surface facing forward of a vehicle when attached to the vehicle). The connector 14 is inserted into an end of a hose which diverges via a T-joint from hose extending toward the rear nozzle. This allows the washer fluid W to be supplied into the camera nozzle 11. A passage 15 for the washer fluid W is formed inside the connector 14. The passage 15 linearly extends in the nozzle body 13 from the back side toward the front side of the nozzle body 13 (from the front side toward the rear side in the vehicle). Further, the passage 15 reaches a discharge portion 16 (an inside spray hole 18 discussed below) located at the front side of the nozzle body 13 (the rear surface in the vehicle 1).

A check valve 17 is located in the passage 15. When the pump device 4 is activated to supply the washer fluid W, the check valve 17 opens to communicate with the discharge portion 16, thereby supplying the washer fluid W. When a pump device is stopped, the check valve 17 closes and disconnects from the discharge portion 16, thereby stopping supply of the washer fluid W to the discharge portion 16. That is when the pump device is not operating, leakage of washer fluid W from the discharge portion 16 is prevented.

At the end of the passage 15, that is, at the boundary between the passage 15 and the discharge portion 16, the circular inside spray hole 18 is provided to be coaxial with the passage 15. The inside spray hole 18 has an open diameter that is sufficiently smaller than the inner diameter of the passage 15. The inside spray hole 18 sprays the washer fluid W having an increased flow velocity to the discharge portion 16 in a diffusing manner.

The discharge portion 16 is located above the camera body 10 (the image capturing window 10b) when viewed from the front of the camera body 10, and slightly projects relative to the image capturing surface 10a of the camera body 10. A discharge port 19 is located at the lower side (the surface at the vertically lower side) of the discharge portion 16. The discharge port 19 has a rectangular shape with the widthwise measurement greater than the front-rear measurement. One of the long sides is formed to be flush with the image capturing surface 10*a*. The opening length L1 of the discharge port 19 along the widthwise direction is substantially equal to the diameter 12 of the circular image capturing window 10*b* of the image capturing surface 10*a*. The opening length 13 of the discharge port along the front-rear direction, which is perpendicular to the widthwise direction, is sufficiently less than the opening length L1 along the widthwise direction. Also, the discharge port 19 is formed to be flush with the image capturing surface 10*a*. Therefore, the projection amount of the discharge portion 16 relative to the image capturing surface 10*a* is sufficiently small.

A passage 20 formed in the discharge portion 16 connects the discharge port 19 with the inside spray hole 18. The passage 20 is a rectangular parallelepiped space having the same rectangular cross section as the opening shape of the discharge port 19. The passage 20 is formed along a plane perpendicular to the extending direction of the passage 15 in the nozzle body 13, which extends from the connector 14 to the inside spray hole 18. That is, the inner surface of the passage 20 includes a flat opposing surface 20*a* that faces the inside spray hole 18 and is perpendicular to the spray direction at the center of the inside spray hole 18. The passage 20 is parallel with the image capturing surface 10*a*. That is, the inner surface of the passage 20 includes a flat surface 20*b* that faces the opposing surface 20*a*. The flat surface 20*b* is flush with the image capturing surface 10*a*. In other words, the discharge port 19 (more specifically, the flat surface 20*b*, which defines a part of the discharge port 19) is formed adjacent to the image capturing surface 10*a* without a step in between. The passage 20 extends to a position vertically above the part in which the inside spray hole 18 is formed. That is, the passage 20 slightly extends in the direction opposite to the discharge port 19.

The camera nozzle 11 having the above described configuration is attached to the rear of the vehicle together with the camera body 10. One end of the hose is fitted to the connector 14 of the camera nozzle 11. When the pump device is activated, the washer fluid W is supplied to the camera nozzle 11 as well as to the rear nozzle. In response to the supply of the washer fluid W, the check valve in the nozzle body 13 is opened, so that the washer fluid W is supplied to the discharge portion 16 via the inside spray hole 18.

The washer fluid W sprayed from the inside spray hole 18 hits the opposing surface 20*a* in the discharge portion 16 and is then discharged from the discharge port 19 while filling the passage 20 in the discharge portion 16 and being regulated by the opening shape of the discharge port 19. That is, the washer fluid W passes through the passage 20, which extends along a direction intersecting the spray direction from the inside spray hole 18, and is then discharged through the discharge port 19 of the passage 20. More specifically, the washer fluid W is discharged at a high flow velocity parallel to the image capturing surface 10*a* of the camera body 10 and in a constant width covering at least the image capturing window 10*b*, so as to reliably wash away foreign object such as rain drops and mud from the image capturing surface 10*a* in an area around the image capturing window 10*b*.

The embodiment of FIGS. 11 and 12 has the following advantages.

(1) The camera nozzle 11 includes the inside spray hole 18 and the discharge portion 16, which has the passage 20 and the discharge port 19. The passage 20 extends along a direction perpendicular to the spray direction of the inside spray hole 18. The washer fluid W sprayed from the inside spray hole 18 is discharged from the discharge port 19 along the image capturing surface 10*a* of the camera body 10, while filling the passage 20. This washes the image capturing surface 10*a*. That is, since the washer fluid W is discharged along the image capturing surface 10*a*, the amount of projection of the discharge portion 16 relative to the image capturing surface 10*a* can be minimized. Since the washer fluid W is sprayed from the inside spray hole 18, its flow velocity is increased. Also, since the washer fluid W passes through the passage 20, the washer fluid W is discharged in a form suitable for washing the image capturing surface 10*a* (the image capturing window 10*b*, or a target to be washed). Therefore, the image capturing surface 10*a* is reliably washed.

(2) Since the discharge port 19 is formed to have no step with the image capturing surface 10*a* of the camera body 10, the washer fluid W discharged from the discharge port 19 can be supplied to the image capturing surface 10*a* while maintaining its high flow velocity. This ensures reliable washing while reducing the flow amount of the washer fluid W.

(3) The discharge port 19 discharges the washer fluid W along a direction parallel to the image capturing surface 10*a* of the camera body 10. This also ensures the supply of the washer fluid to the image capturing window 10*b*, which is a target to be washed, while maintaining a high flow velocity. Also, this ensures reliable washing while reducing the flow amount of the washer fluid W.

(4) The discharge port 19 discharges the washer fluid W in a width that is substantially equal to the image capturing window 10*b*, which is a target to be washed in the image capturing surface 10*a* of the camera body 10. This ensures reliable washing while reducing the wasteful use of the washer fluid W.

(5) The discharge port 19 discharges the washer fluid W in the vertically downward direction. Therefore, even if the discharge pressure is low, the washer fluid W is supplied to the image capturing window 10*b*, which is a target to be washed, while maintaining a high flow velocity.

(6) The check valve 17 located in the passage 15 is opened when receiving the introducing pressure via the washer fluid W generated by operation of the pump device. This allows the washer fluid W to be discharged from the nozzle 11 only when in use. Therefore, leakage of the washer fluid W from the nozzle 11 (the discharge port 19) is prevented when not in use. This prevents the washer fluid W from collecting on the image capturing surface 10*a* of the camera body 10.

(7) The nozzle detachably holds the camera body 10. Therefore, the existing camera body 10 can be attached to the nozzle 11. Only the camera 10 or only the nozzle 11 can be replaced, which facilitates maintenance.

(8) Since the nozzle 11 is integrated with the camera body 10, the nozzle 11 can be easily installed in a vehicle.

(9) Being attached to the rear of the vehicle, the rear view camera C is likely to be splashed with mud or water droplets when the vehicle is moving. It is therefore advantageous to provide the rear view camera C with the nozzle 11. The vehicle of the present embodiment has the rear nozzle 6 for spraying the washer fluid W onto the rear window of the vehicle. Thus, it is easy to route the hose for supplying the washer fluid W to the nozzle 11.

(10) A washer device 1 for a vehicle is configured to supply the washer fluid W, which is used for washing vehicle windows such as the windshield and the rear window of the vehicle to the nozzle 11 for the camera body 10. Therefore, a means for supplying the washer fluid W to wash the image capturing surface 10*a* of the camera body 10 can be realized by a simple system.

As described in U.S. Pat. No. 9,278,670, as shown in FIGS. 13 and 14, an optical sensor unit 1 (an on-board optical sensor apparatus) includes a camera cover (an on-board optical sensor cover) and a camera 3. The camera 3 is attached to the camera cover 2 in a detachable manner. In the camera 3, a lens 5 is located on a front side (a left side in FIG. 14) of a casing 4, and a power supply line (not shown) and an image signal output line (not shown) are drawn from a rear side (a right side in FIG. 14) of the casing 4. The power supply line is used to supply power to the camera 3. The image signal output line is used to output an image signal. The lens 5 is a fisheye lens and has a curved lens surface 5a that can take a wide angle image.

In the camera cover 2, a holder 7 for holding the camera 3 is located in a casing 6, and an opening 8 is located on a rear side of the casing 6. The camera 3 is attached to the camera cover 2 through the opening 8 and detached from the camera cover 2 through the opening 8. In the camera cover 2, a washer nozzle 9 is located above the holder 7. The washer nozzle 9 has a "L" shape. A base end 9a of the washer nozzle 9 is connected to a tube 10 on the rear side of the casing 6. A top end 9b of the washer nozzle 9 has an opening directed downward and serves as a spray opening 11. In a condition where the camera 3 is normally held in the holder 7 (in a normal use condition shown in FIGS. 13 and 14), the lens surface 5a of the lens 5 of the camera 3 is located directly below the tip end 9b of the washer nozzle 9.

Despite the above art and other related art, there are a number of disadvantages associated with the prior art.

SUMMARY

An object of at least one embodiment of the present invention is to provide an optical system to facilitate vehicle operation, a cleaning system to clean an optical element of the optical system and a hollow protective plastic enclosure for use therein wherein the enclosure has few plastic parts thereby making the enclosure and the system compact, light weight, and low cost to manufacture, assemble and maintain.

In carrying out the above object and other objects of at least one embodiment of the present invention, an exterior vehicle camera cleaning system is provided. The system includes a flexible hose having first and second ends, a nozzle fluidly coupled to the hose at the first end of the hose and a hollow protective plastic enclosure having a passageway extending through the enclosure and housing a portion of the hose within the passageway. The enclosure is configured to receive a camera assembly within an interior of the enclosure. The nozzle is configured and positioned at the first end of the hose to direct the flow of a cleaning fluid therethrough to an exterior surface of a transparent optical element to clean the exterior surface to allow the camera assembly to have an unobstructed view of an environment outside the vehicle.

The enclosure may include first and second opposed plastic parts secured to one another about their outer perimeters which allows the two parts to come together in a closed configuration in which the parts at least partially define the passageway.

The optical element may be an optically transparent window of the enclosure through which the camera assembly receives visible and near-visible radiation.

The optical element may be a lens of the camera assembly. The lens may extend through an aperture in the enclosure. The aperture may be at least partially defined by the parts in the closed configuration.

The plastic may be an injection molded plastic or a thermoformed plastic.

The cleaning fluid may be a cleaning liquid. The nozzle may be adapted for use in cleaning systems on vehicles of the type which have a pressurized washer system for windshield wipers.

The enclosure may have a hinge such as a living hinge to join the parts at an edge of the enclosure.

The parts may be fused or welded together to secure the enclosure in the closed configuration.

Each of the parts may be formed as a unitary molded part.

The enclosure may be formed as a unitary molded part.

Further, in carrying out the above object and other objects of at least one embodiment of the present invention, an optical system to facilitate vehicle operation is provided. The system includes a camera assembly and a hollow protective plastic enclosure having a passageway extending through the enclosure and configured to house a portion of a flexible hose within the passageway. The enclosure receives and retains the camera assembly within an interior of the enclosure. A nozzle fluidly coupled to the hose is configured and positioned at the first end of the hose to direct the flow of a cleaning fluid therethrough to an exterior surface of a transparent optical element to clean the exterior surface to allow the camera assembly to have an unobstructed view of an environment outside the vehicle.

Still further in carrying out the above objects and other objects of at least one embodiment of the present invention, a hollow, protective plastic enclosure for use in an exterior vehicle camera cleaning system is provided. The enclosure includes a passageway extending through the enclosure and configured to house a portion of a flexible hose of the system within the passageway. The enclosure is configured to receive a camera assembly within an interior of the enclosure. A nozzle fluidly coupled to the hose is configured and positioned at the first end of the hose to direct the flow of a cleaning fluid therethrough to an exterior surface of a transparent optical element to clean the exterior surface to allow the camera assembly to have an unobstructed view of an environment outside the vehicle.

BRIEF DESCRIPTION OF THE DRAWINGS

FIG. 20 is a view, similar to the view of FIG. 17, of a second embodiment of an enclosure;

FIG. 21 is a view, similar to the view of FIG. 18, of the enclosure of FIG. 20;

FIG. 22 is a view, similar to the view of FIG. 19, of the enclosure, the hose and the nozzle taken along lines 22-22 of FIG. 20;

FIG. 25 is a view, similar to the views of FIGS. 17 and 20, having a transparent enclosure of FIGS. 23 and 24;

FIG. 26 is a view, similar to the view of FIGS. 18 and 21, showing a lens of a camera assembly within the transparent enclosure of FIGS. 23-25;

FIG. 27 is a view, similar to the views of FIGS. 19 and 22, showing the lens of FIG. 26 within the transparent enclosure of FIGS. 23-26;

DETAILED DESCRIPTION

Figure 1:
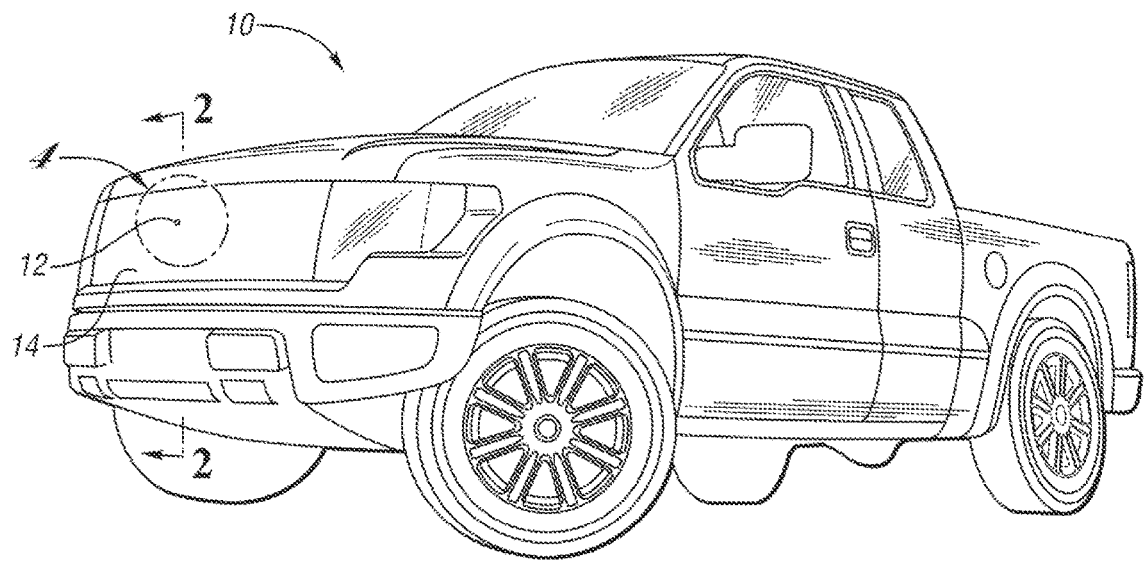
FIG. 1 is a perspective view of a vehicle with a forward-facing camera located on a grill of the vehicle.
Figure 2:
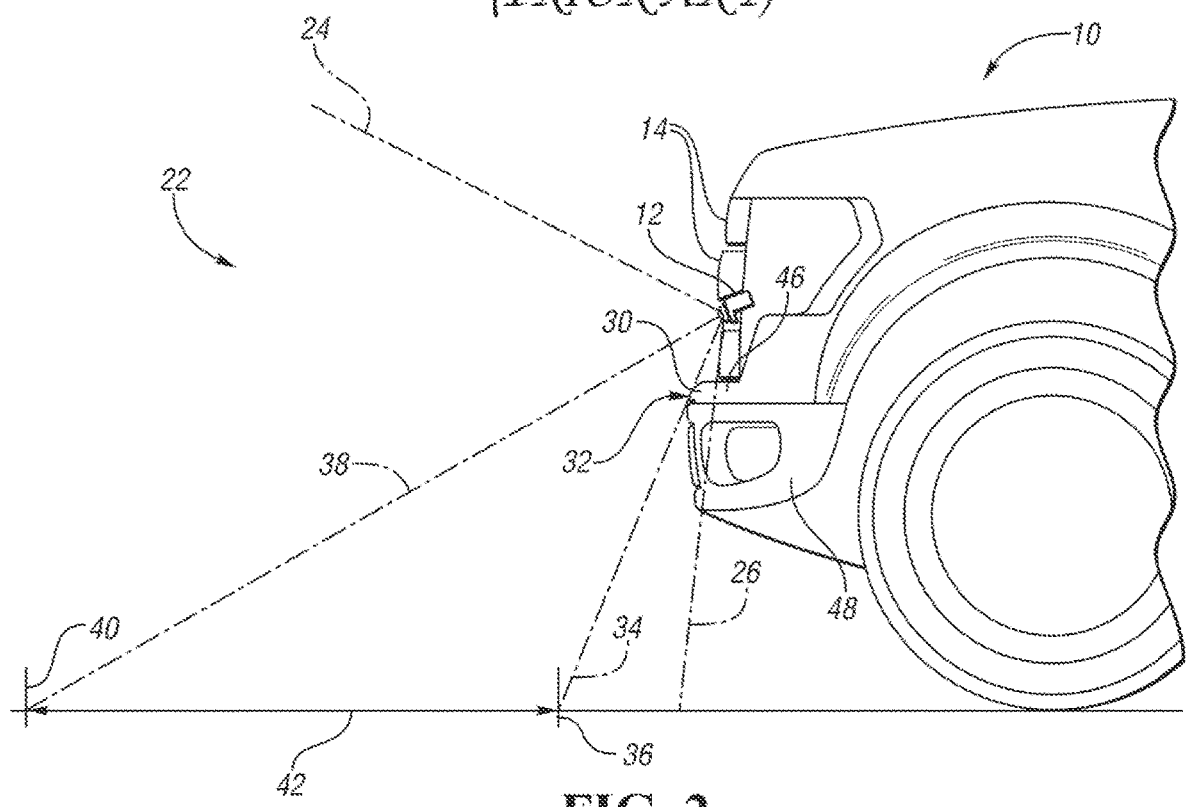
FIG. 2 is a diagrammatic, partially broken away, view in which a portion of the figure is taken along lines 2-2 of FIG. 1.
Figure 3:
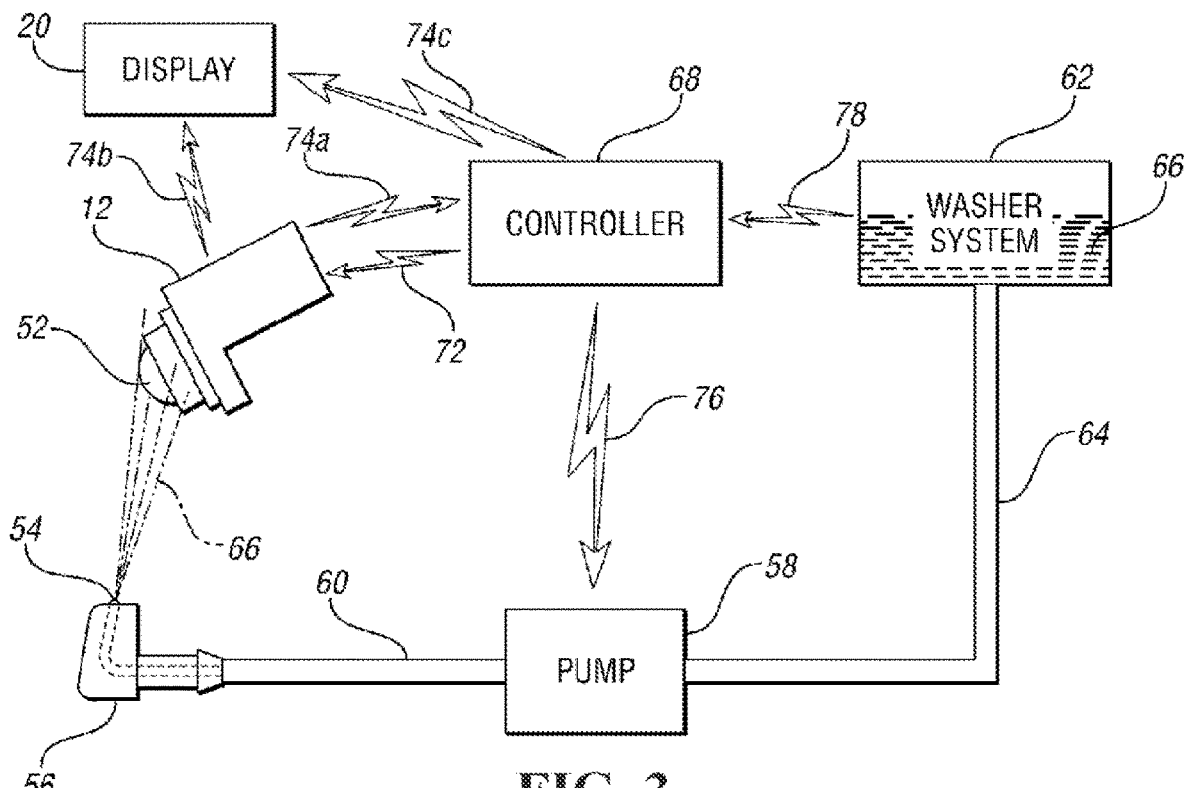
FIG. 3 is a schematic block diagram view of the interaction between the components used in an automatic camera wash system.
Figure 4:
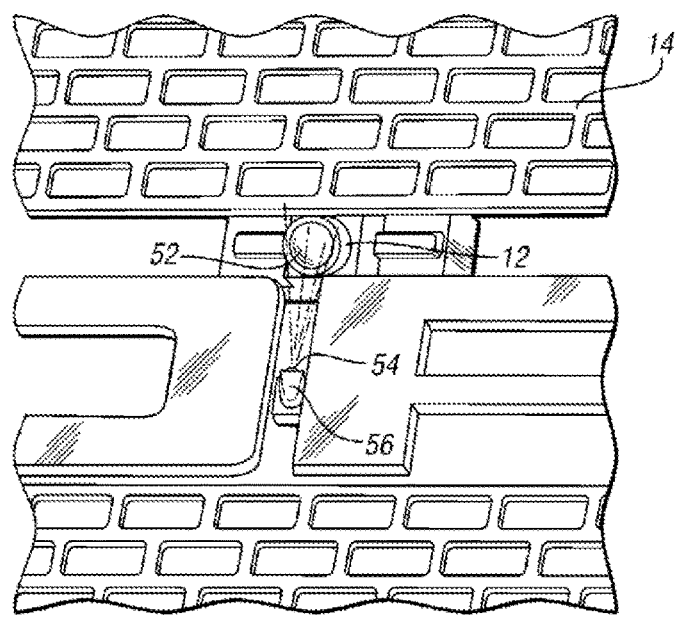
FIG. 4 is a fragmentary view (i.e. within the circle 4 in FIG. 1) of a vehicle grill with a forward-facing camera.
Figure 5:
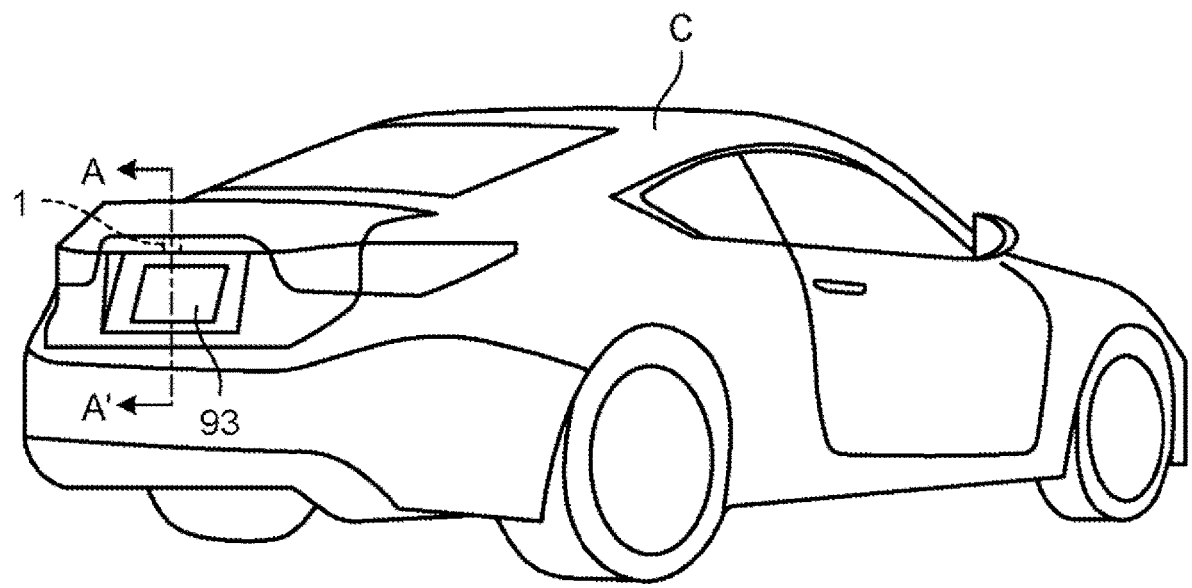
FIG. 5 is a diagram illustrating a vehicle that is mounted with a rear facing camera unit.
Figure 6:
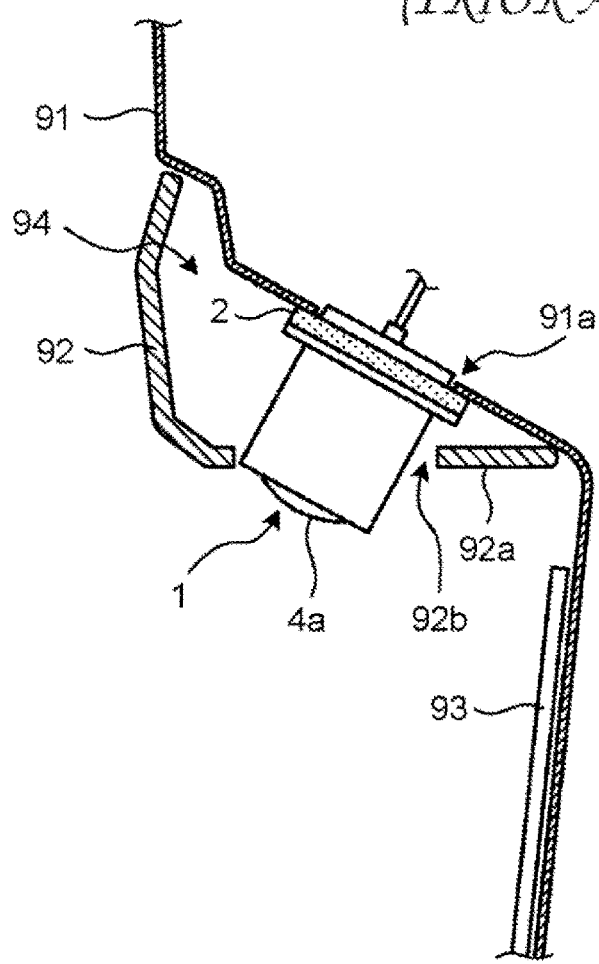
FIG. 6 is a cross-sectional, partially broken away, view along lines A-A' of FIG. 5.
Figure 7:
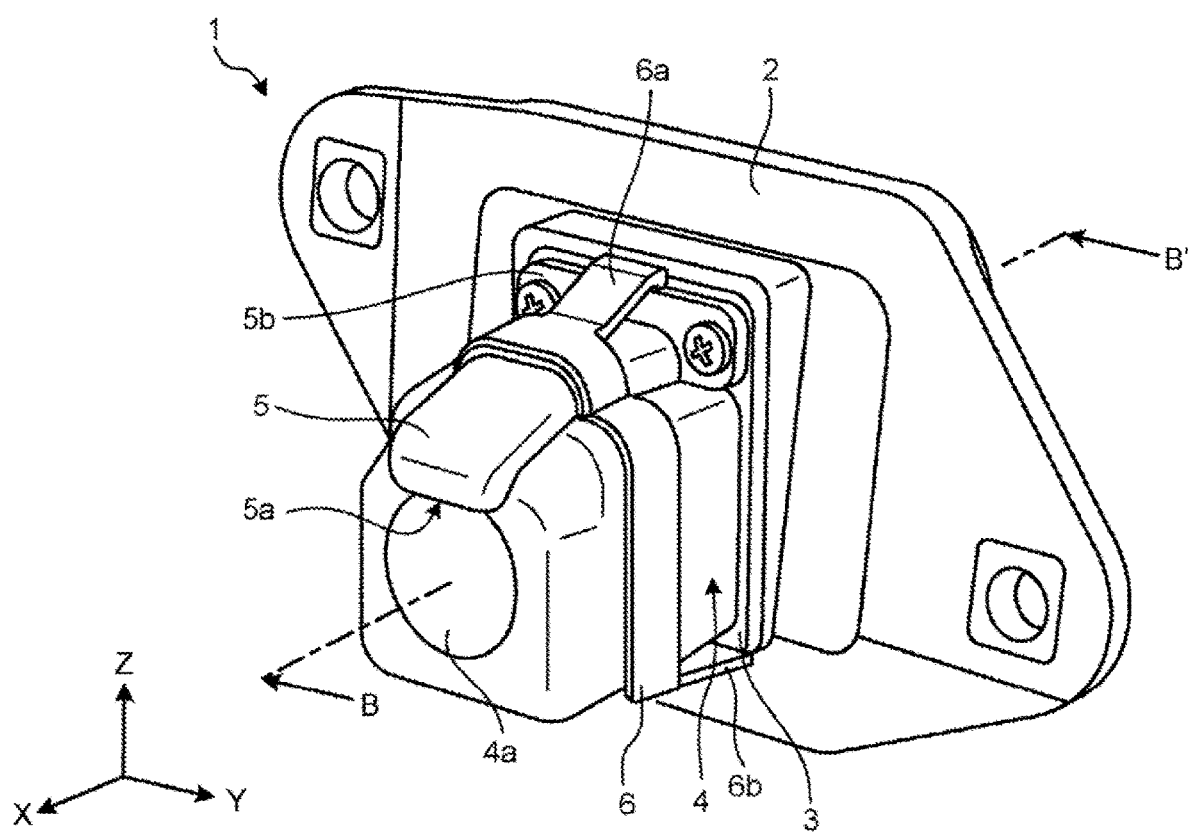
FIG. 7 is a perspective view of the camera unit of FIG. 5.
Figure 8:
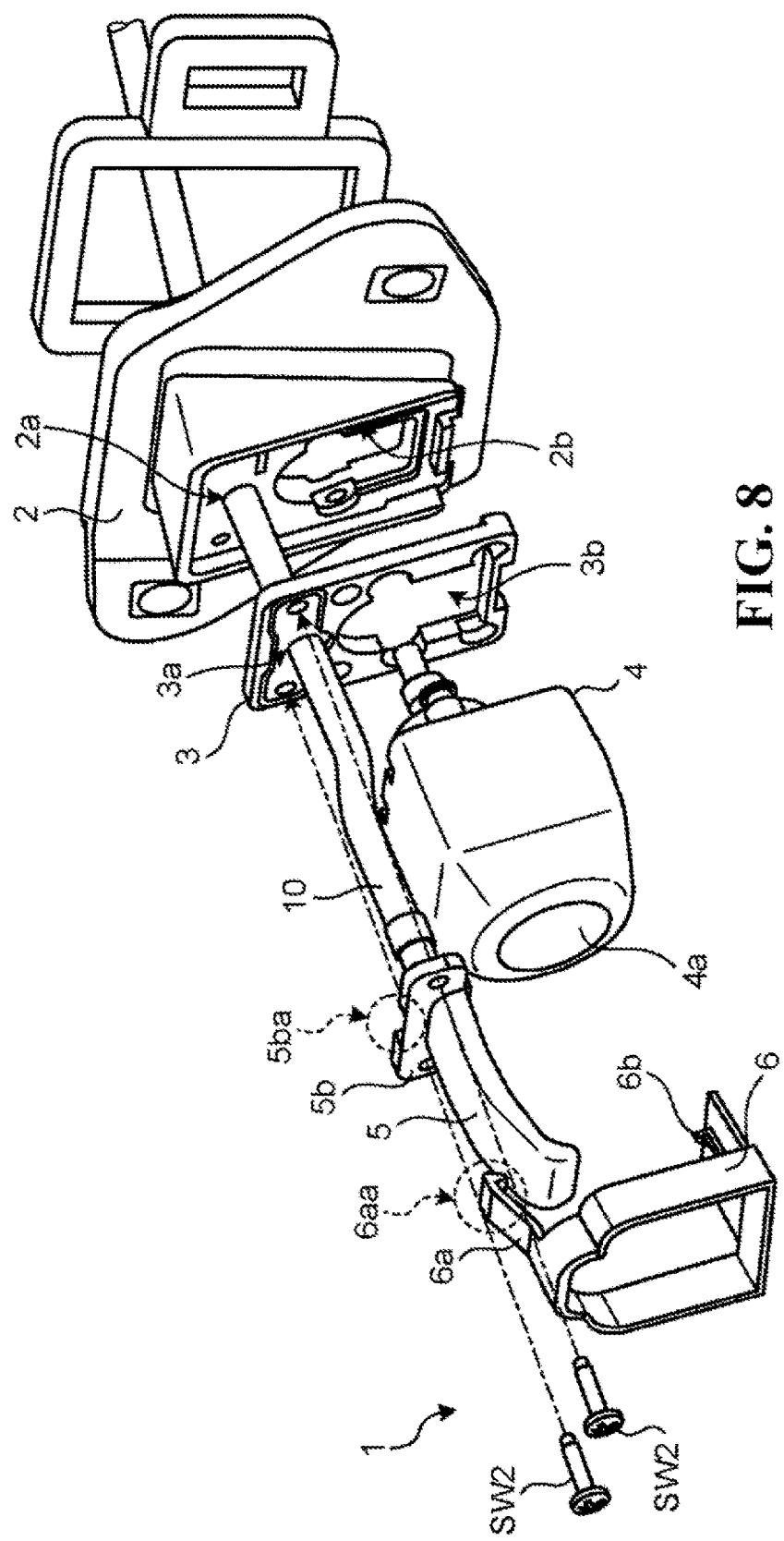
FIG. 8 is an exploded perspective view of the camera unit of FIG. 7.
Figure 9:
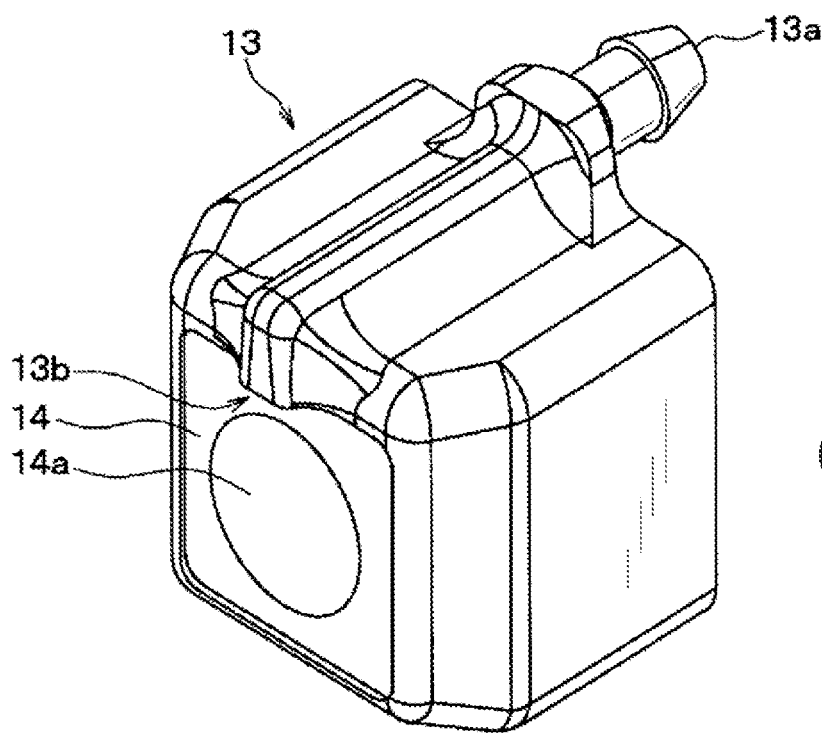
FIG. 9 is a perspective view showing an injection nozzle in a prior art camera washing device.
Figure 10:
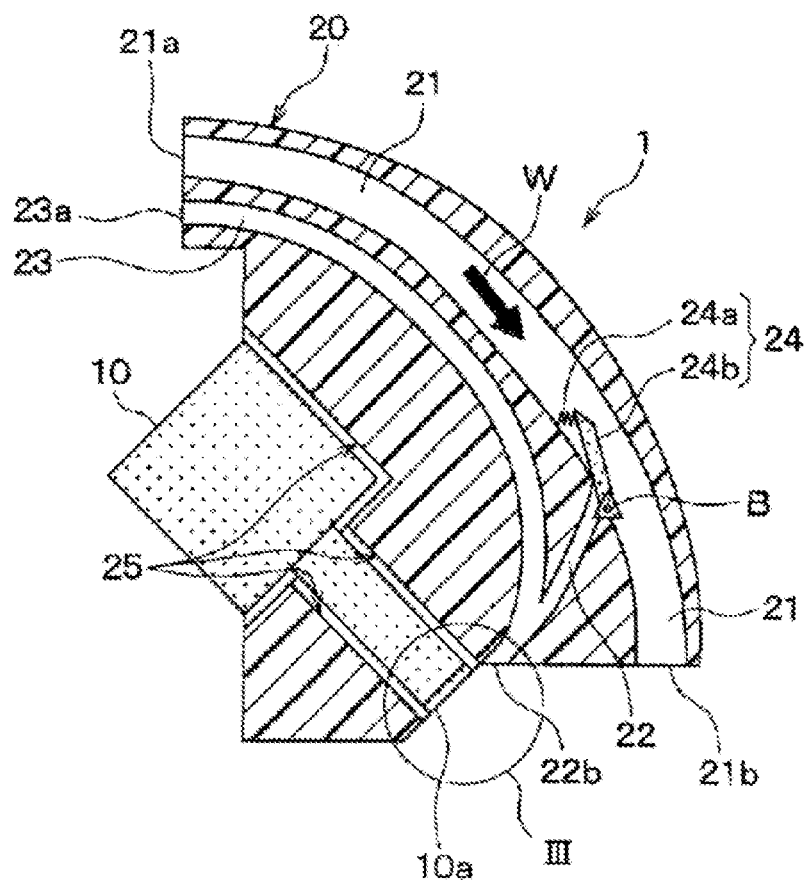
FIG. 10 is a cross-sectional, partially broken away, view of a washer nozzle-equipped camera apparatus.
Figure 11:
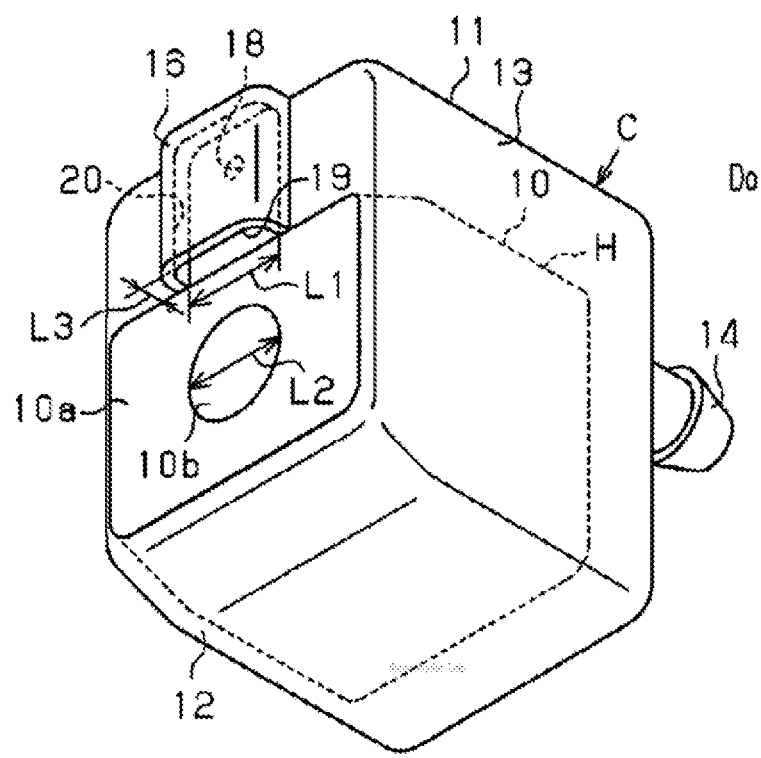
FIG. 11 is a perspective view illustrating a prior art mounted camera with a washer nozzle in a washer device for a vehicle.
Figure 12:
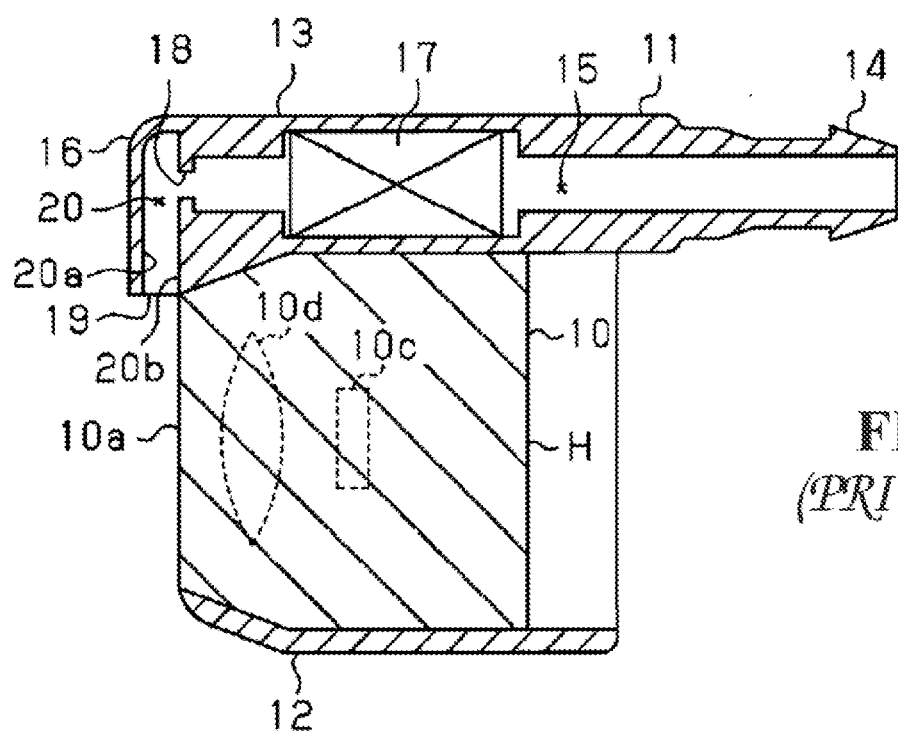
FIG. 12 is a cross-sectional view illustrating the vehicle mounted camera with the washer nozzle shown in FIG. 11.
Figure 13:
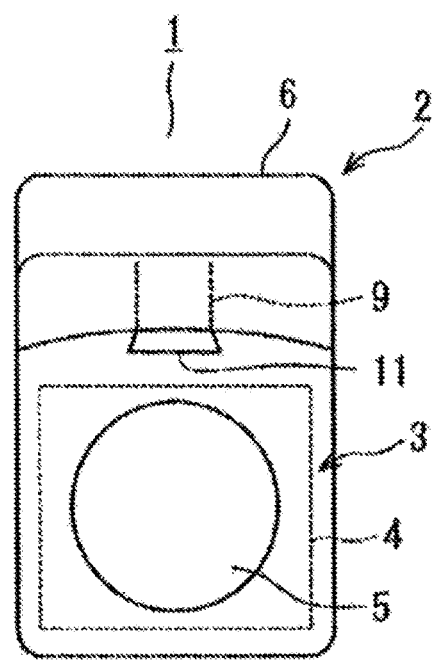
FIG. 13 is a diagram illustrating a front view of a prior art optical sensor unit.
Figure 14:
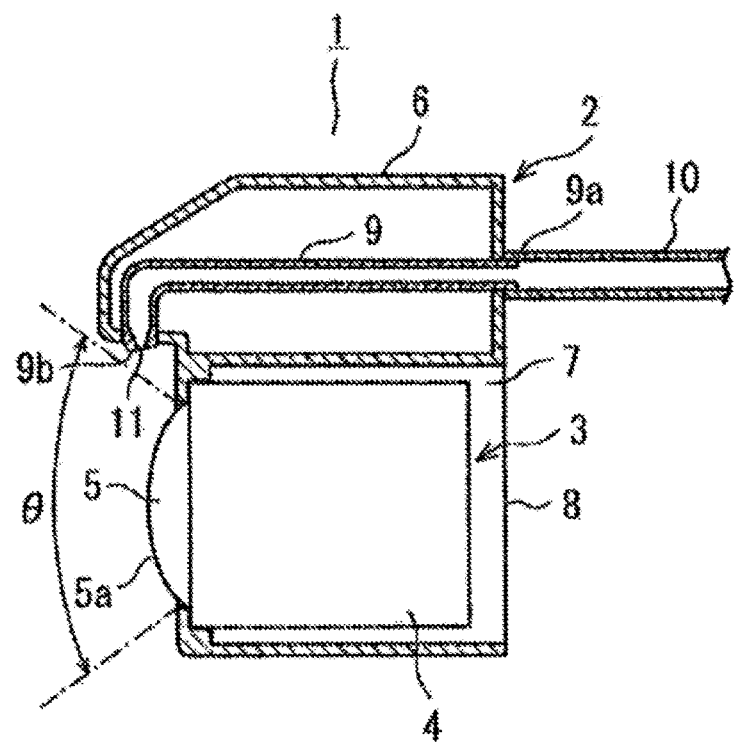
FIG. 14 is a diagram illustrating a cross-sectional side view of the optical sensor unit of FIG. 13.
Figure 15:
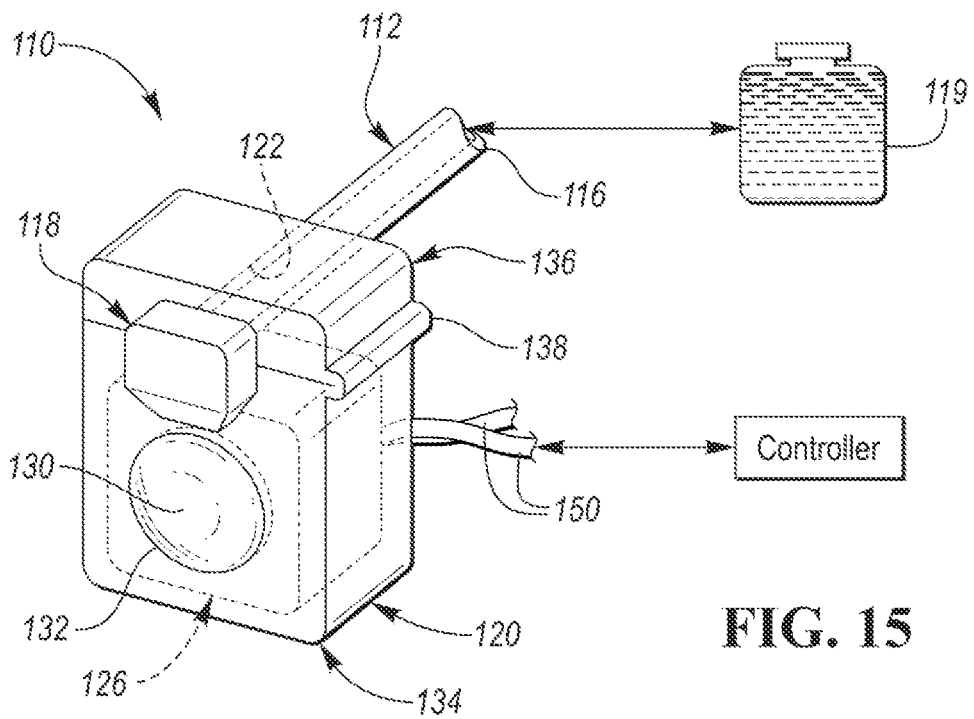
FIG. 15 is a perspective view, partially broken away, of an optical system and a cleaning system for cleaning the optical system constructed in accordance with at least one embodiment of the present invention.
Figure 16:
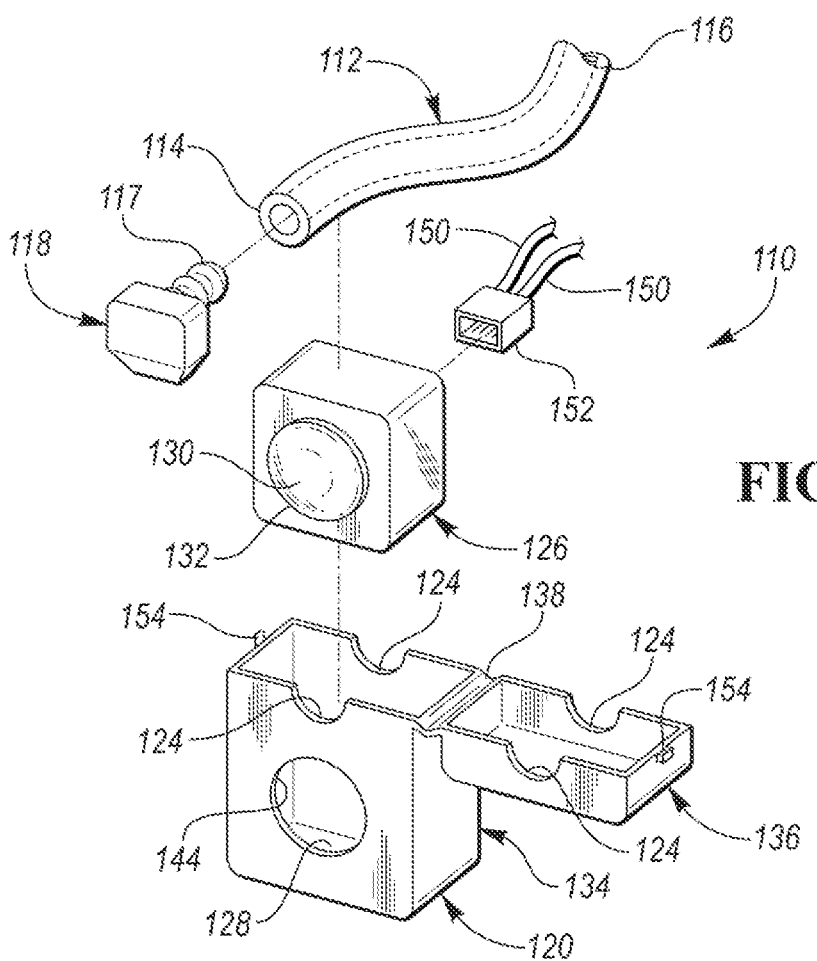
FIG. 16 is an exploded perspective view, partially broken away, showing different parts of the systems of FIG. 15.
Figures 17, 18:
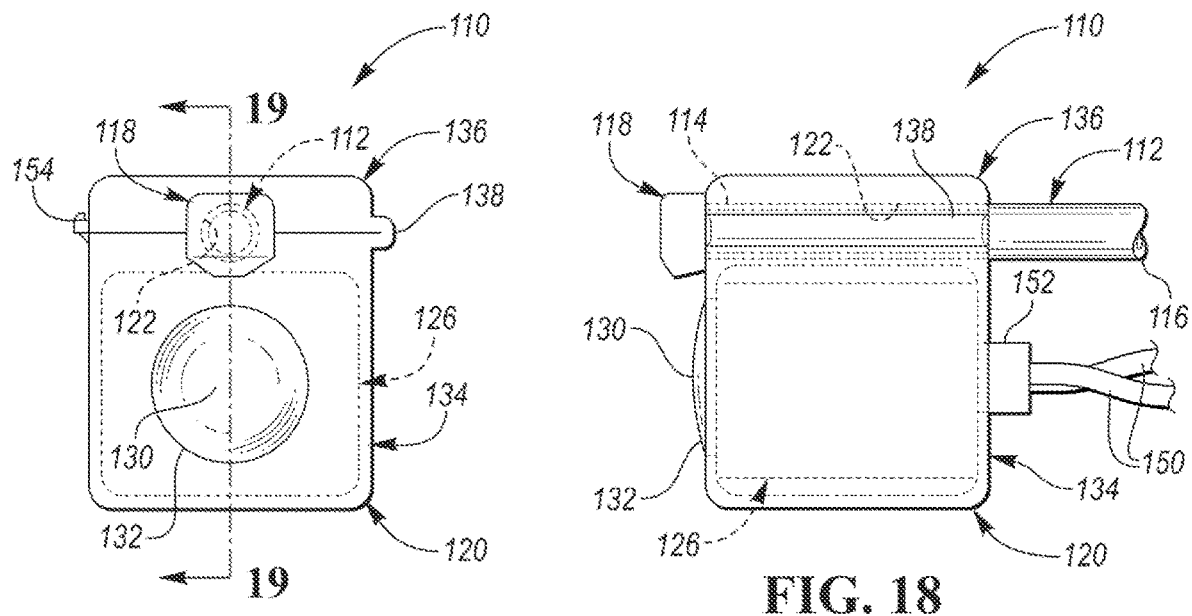
FIG. 17 is a front elevational view of a hollow, protective plastic enclosure of FIGS. 15 and 16.
FIG. 18 is a side elevational view, partially broken away, of the enclosure and a hose and a nozzle of FIGS. 15-17.
Figure 19:
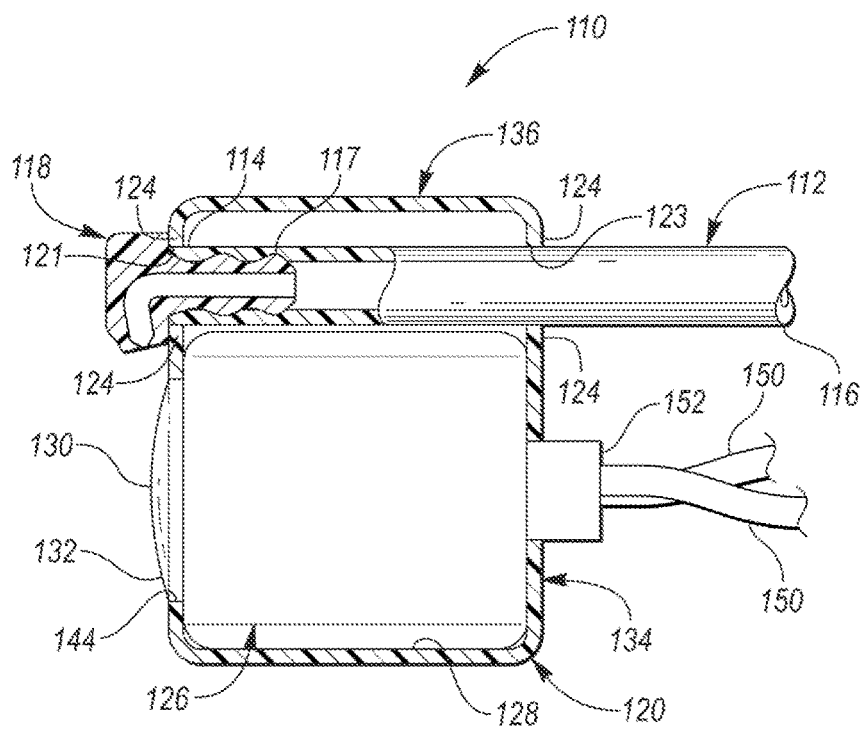
FIG. 19 is a side view, partially broken away and in cross section, of the enclosure, the hose and the nozzle taken along lines 19-19 of FIG. 17.
Figure 23:
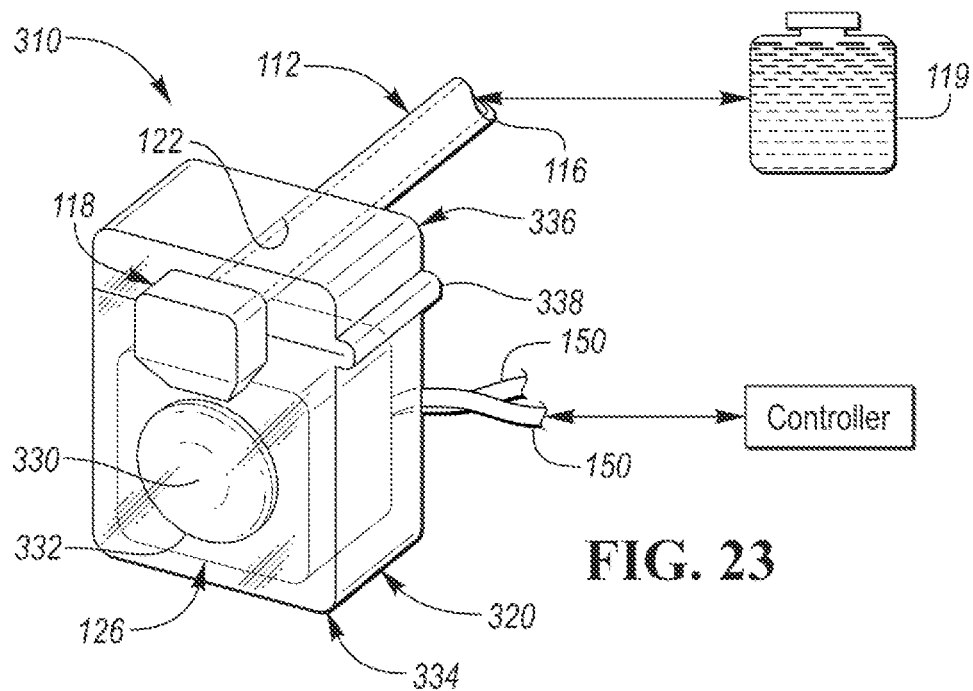
FIG. 23 is a view, similar to the view of FIG. 15, of a third embodiment of an optical system and a cleaning system for cleaning the optical system.
Figure 24:
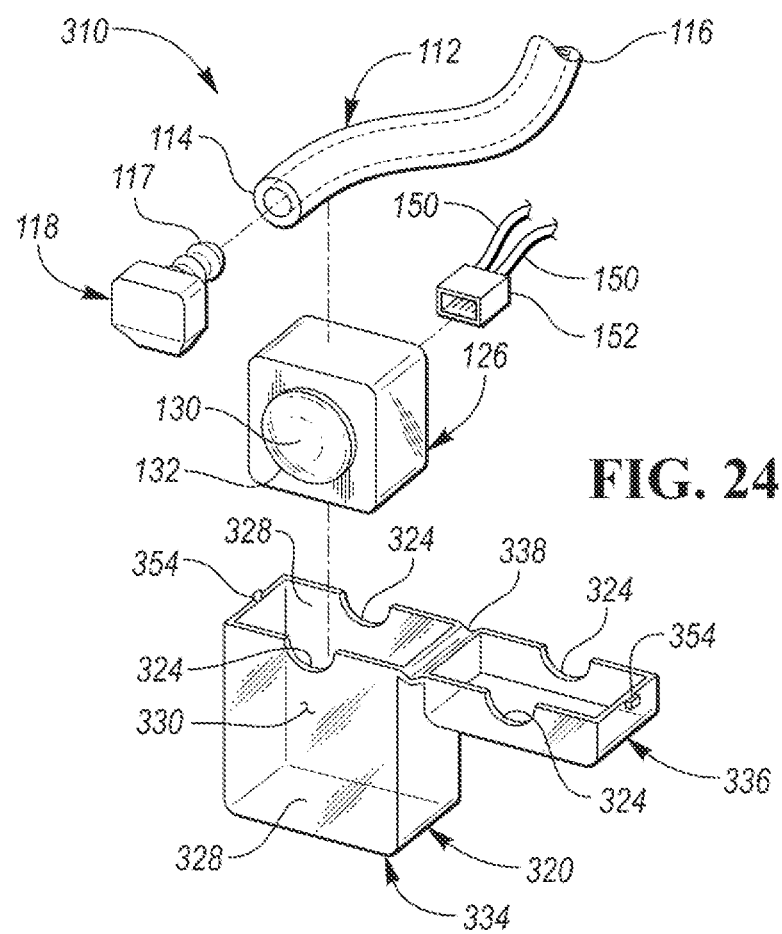
FIG. 24 is a view, similar to the view of FIG. 16, showing various components of the third embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In particular, multiple embodiments of the present invention are disclosed. Parts which are the same or similar in either structure or function in each of the embodiments have the same reference number. Parts which are modified in the embodiments have same last two digits but a different first digit which indicates what embodiment the part belong to. For example, a cleaning system of the first embodiment is designated by the number 110, of the second embodiment 210, of the third embodiment 310 and the fourth embodiment 410.

An exterior vehicle camera cleaning system constructed in accordance with the first embodiment of the present invention is generally indicated at 110 in FIGS. 15-19. The system 110 includes a compressible, flexible hose, generally indicated at 112, having first and second ends 114 and 116, respectively. A plastic nozzle, generally indicated at 118, is fluidly coupled to the hose 112 there within at the first end 114 of the hose 112 via a coupler or a connector 117 integrally formed with the nozzle 118. The second end 116 of the hose 112 is fluidly connected to a cleaning fluid reservoir 119 such as a washer liquid reservoir. The cleaning fluid may be a cleaning liquid and the nozzle 118 and the hose 112 may be adapted for use in cleaning systems on vehicles of the type which have a pressurized washer system for windshield wipers.

The system 110 also includes a hollow, protective plastic enclosure, generally indicated at 120, having a passageway 122 extending through the enclosure 120 and housing a portion of the hose 112 within the passageway 122.

In the first embodiment, the enclosure 120 includes first and second opposed plastic parts, generally indicated at 134 and 136, respectively, hingedly secured to one another by a hinge or hinge area 138 which allows the two parts 134 and 136 to come together in a closed configuration in which the parts 134 and 136 at least partially define the passageway 122 at half moon sections 124 thereof. The hinge area 138 may be a living hinge joining the parts 134 and 136 at an edge of the enclosure 120. Alternatively, the parts 134 and 136 are secured to one another about their outer perimeters after a camera assembly, generally indicated at 126, and the hose 112 have been placed in the enclosure 120 in its open configuration without the need for a hinge such as the hinge area 138. The parts 134 and 136 may be fused or welded together at their edges or perimeters to secure the enclosure 120 in the closed configuration.

The two opposed halves 134 and 136 may be hingedly secured to one another in a clamshell arrangement by the hinge 138 and secured around the hose 112 in a closed configuration of the halves 134 and 136. The halves 134 and 136 clamp and compress the hose 112 therebetween. Two opposed channels 121 and 123 (FIG. 19) defined in the hose-receiving faces of the two opposed halves 134 and 136 cooperate to at least partially define the substantially horizontal passageway 122 through the enclosure 120 for the hose 112. The enclosure 120 is also configured to receive the camera assembly 126 of an optical system within an interior 128 of the enclosure 120.

The nozzle 118 is configured and coupled at the first end 114 of the hose 112 to direct the flow of the cleaning fluid therethrough to an exterior surface 130 of a transparent optical element which is the first, second and fourth embodiments is a lens 132 of the camera assembly 126 to clean the exterior surface 130 to allow the camera assembly 126 to have an unobstructed view of an environment outside the vehicle.

In the third embodiment of FIGS. 23-27, the optical element is an optically transparent window 332 of the enclosure 320 through which the camera assembly 126 receives visible and near visible radiation. An exterior surface 330 of the window 332 is cleaned. In the embodiments of FIGS. 15-22 and 29, the optical element is the lens 132 of the camera assembly 126. In these embodiments, the lens 132 extends through an aperture 144 in the enclosure 120. The aperture 144 (like the passageway 120) may be formed by the part halves 134 and 136 in their closed configuration as shown in FIGS. 20-22 and FIG. 28.

Figure 28:
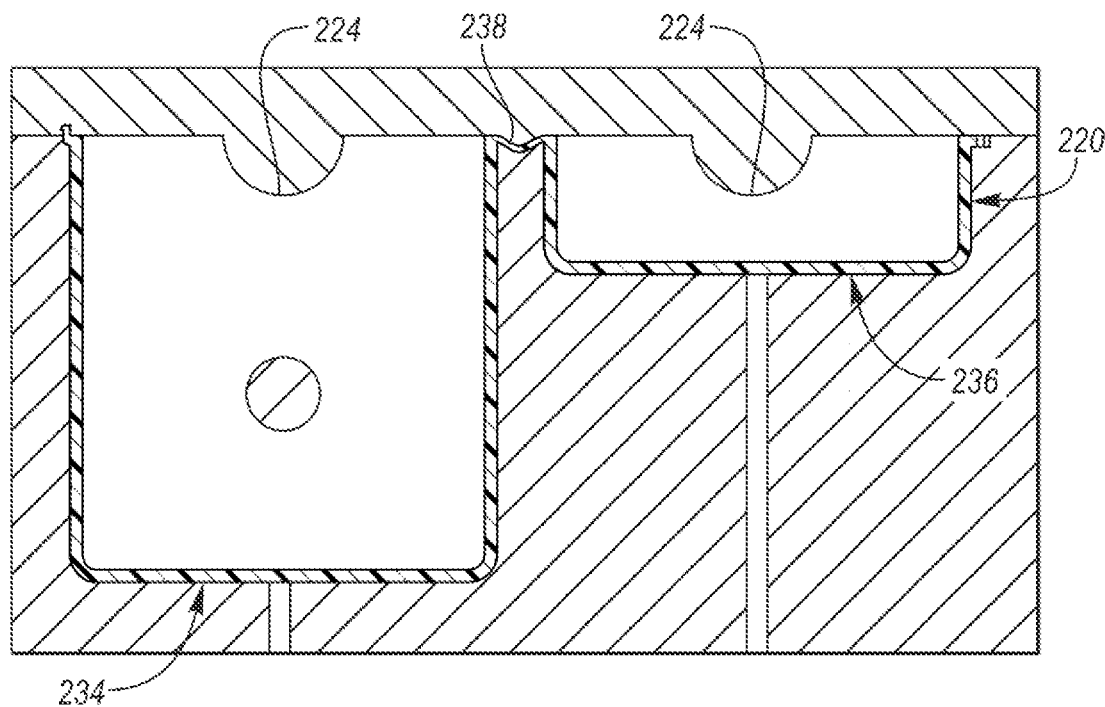
FIG. 28 is a sectional view of the clamshell enclosure of FIGS. 20-22 within upper and lower mold halves wherein two holes or apertures, one for the lens and one for the hose are molded-in the enclosure.

The plastic of the enclosures 120, 220 and 420 is typically an opaque injection molded plastic or a thermoformed plastic. The plastic of the enclosure 320 is typically optically transparent injection molded plastic or thermoformed plastic. Each of the parts 134 and 136 (and 234 and 236; 334 and 336; and 434 and 436) may be formed as a unitary molded part with a hinge 138 (238, 338 and 438) between the parts 134 and 136. The enclosure 120 (220, 320 and 420) may be formed as a unitary molded part as shown in FIG. 28.

The system 110 is a low cost system which properly works over a wide range of temperatures and humidity conditions. The enclosure 120 provides air tightness and corrosion resistance for the camera assembly 126. The airtightness of the enclosure 120 serves both to isolate the camera assembly 126 from ambient temperature swings and to prevent the assembly 126 from corrosive gases and other airborne material. The enclosure 120 provides unobstructed lines of sight, mechanical positioning accuracy and stability and optical clarity for the camera assembly 126.

A coupler 152 extends into the enclosure 120 to couple electrical wiring 150 for power to the camera assembly 126 and video data from the assembly 126. The coupler 152 is preferably air-tight with the enclosure 120. One of the wires 150 is electrically coupled to a controller which receives the video data signals from the assembly 126.

The camera assembly 126 may include a monochromatic or color (re RGB) visible light camera or unit. The video camera or unit typically has a relative wide field of view which includes that area or scene at the rear of the vehicle including one or more opened rear doors of the vehicle which cannot normally be seen by a driver when backing up even with rear view mirrors. The unit may be mounted at a bumper portion by a support so that the video camera can generate a sequence of images from received light which is typically light reflected from pedestrians, obstacles, or hazards at the rear of the vehicle. The light may also be direct light provided by light sources carried by pedestrians or supported on objects at the rear of the vehicle.

A support (not shown) at the rear or the front of the vehicle supports or mounts the unit (such as mechanically) (i.e. such as by clamping) so that the video camera is capable of receiving light, either direct light or reflected light, from obstacles, such as pedestrians or hazards hidden from driver view in a region behind the vehicle. The support preferably supports the unit at a bumper location at the rear of the vehicle to disguise or conceal the camera from unauthorized individuals and to prevent damage to the camera from the environment. The optically transparent window 332 may be provided by the enclosure 320 to protect the camera assembly 126 while still allowing the light to enter the camera's lens system.

At least one embodiment of the invention meets one or more of the following design specifications:
 Easy to manufacture;
 Low cost;
 Easy to mount; and
 Small footprint.

As previously mentioned, preferably the enclosure 120 is a clamshell, one-piece container containing two halves or parts 134 and 136 held together by the hinge area 138 which allows the structure to come together to close. The clamshell container or enclosure 120 can be made of a variety of plastics such as polystyrene, polycarbonate, PVC, foam sheets, etc. The plastic material can be thermoformed or can be injection molded as shown in FIG. 28 into the desired shapes. A single piece of material may be used for the top part 134 and the bottom part 136 with the living hinge 138 that is integral with the material of the parts 134 and 136, rather than added separately.

The clamshell enclosure 120 can use a variety of means of closing and/or sealing in a closed configuration. The enclosure 120 may have self-locking tabs 154, snaps, or have a friction fit. Alternatively, the enclosure 120 may use adhesive, pressure-sensitive tape, labels, staples, or is heat sealed.

When the plastic clamshell container or enclosure 120 is securely heat sealed, it is tamper resistant and deters package vandalism. Also, when so sealed, the enclosure 120 can withstand vehicle-induced vibrations and extreme weather conditions.

Figure 29:
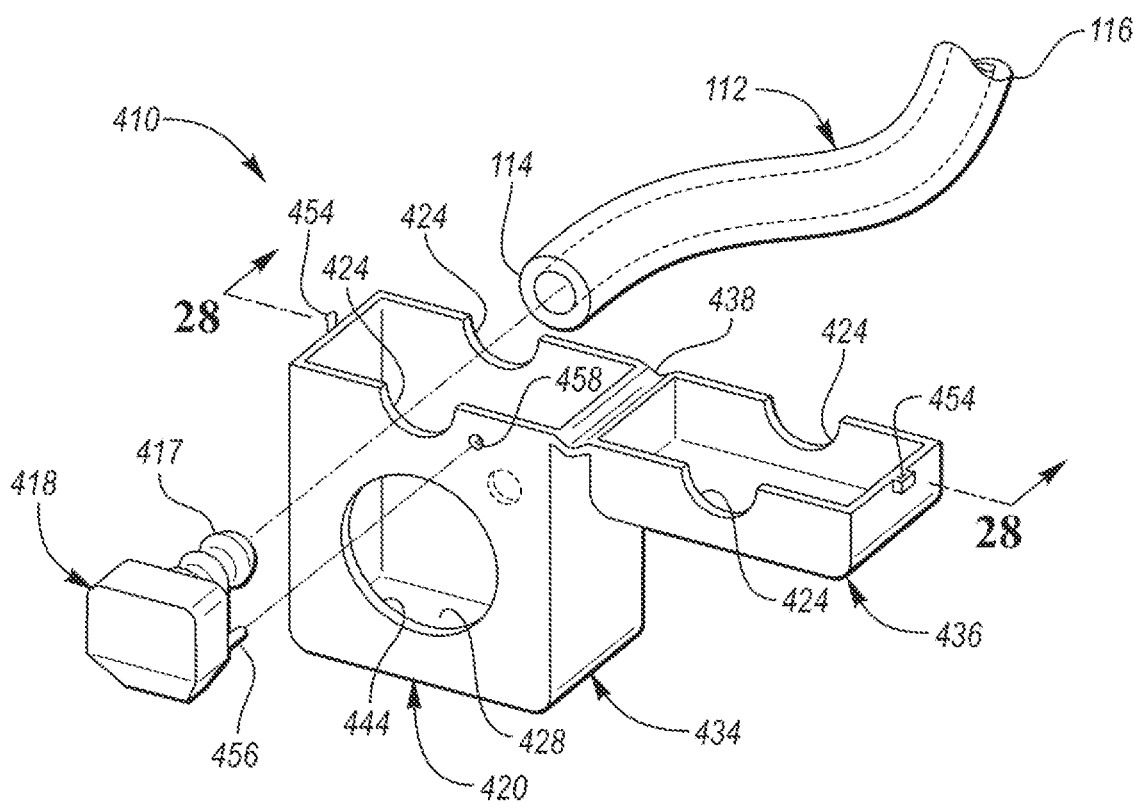
FIG. 29 is a view, similar to the views of FIGS. 16 and 24, of yet another embodiment without a camera assembly but with a post integrally formed on the nozzle; the post is inserted into a hole in the front wall of the enclosure to angularly locate the nozzle relative to the enclosure to ensure proper cleaning of the lens of the camera assembly.

In the fourth embodiment of FIG. 29, the nozzle 418 may include an integrally formed post 456 to be inserted into an aperture or hole 458 formed in the enclosure 420 to properly locate and angularly position the nozzle 418 relative to the enclosure 420 so that the camera lens of a camera assembly (not shown) is properly cleaned.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An exterior vehicle camera cleaning system comprising:
 a hollow, flexible, compressible hose having a cylindrical shape and having first and second ends;
 a plastic nozzle including an integrally formed coupler to fluidly couple the nozzle to the hose at the first end of the hose;
 a hollow protective plastic enclosure having front and rear walls, the front wall having an aperture formed therein, the enclosure having a passageway extending completely through the front and rear walls of the enclosure and housing a portion of the hose within the passageway, the enclosure configured to receive a camera assembly within an interior of the enclosure, and wherein the nozzle includes an integrally formed post inserted in the aperture to properly locate and angularly position the nozzle relative to the enclosure, the nozzle being configured and positioned at the first end of the hose to direct the flow of a cleaning fluid therethrough to an exterior surface of a transparent optical element to clean the exterior surface to allow the camera assembly to have an unobstructed view of an environment outside the vehicle;
 wherein the enclosure includes first and second opposed plastic parts secured to one another about their outer perimeters which allows the two parts to come together in a closed configuration in which the parts at least partially define the passageway and wherein the system provides air tightness to the camera assembly in the closed configuration; and
 wherein the plastic parts clamp and compress a whole circumference of the hose therebetween at the front and rear walls of the enclosure in the closed configuration.

2. The system as claimed in claim 1, wherein the plastic parts clamp and compress the first end of the hose against the coupler of the nozzle at the front wall of the enclosure.

3. The system as claimed in claim 1, wherein the plastic is an injection molded plastic or a thermoformed plastic.

4. The system as claimed in claim 1, wherein the cleaning fluid is a cleaning liquid and wherein the nozzle is adapted for use in cleaning systems on vehicles of the type which have a pressurized washer system for windshield wipers.

5. The system as claimed in claim 2, wherein the enclosure has a hinge to join the parts at an edge of the enclosure.

6. The system as claimed in claim 2, wherein the parts are fused or welded together to secure the enclosure in the closed configuration.

7. The system as claimed in claim 2, wherein each of the parts is formed as a unitary molded part.

8. The system as claimed in claim 1, wherein the enclosure is formed as a unitary molded part.

* * * * *